US008700296B2

(12) United States Patent
Chapman et al.

(10) Patent No.: US 8,700,296 B2
(45) **Date of Patent: *Apr. 15, 2014**

(54) DYNAMIC PREDICTION OF ROAD TRAFFIC CONDITIONS

(75) Inventors: Craig H. Chapman, Redmond, WA (US); Christopher L. Scofield, Seattle, WA (US)

(73) Assignee: Inrix, Inc., Kirkland, WA (US)

( * ) Notice: Subject to any disclaimer, the term of this patent is extended or adjusted under 35 U.S.C. 154(b) by 392 days.

This patent is subject to a terminal disclaimer.

(21) Appl. No.: 13/211,177

(22) Filed: Aug. 16, 2011

(65) Prior Publication Data

US 2012/0072096 A1 Mar. 22, 2012

Related U.S. Application Data

(63) Continuation-in-part of application No. 12/897,621, filed on Oct. 4, 2010, now Pat. No. 8,065,073, which is a continuation of application No. 11/367,463, filed on Mar. 3, 2006, now Pat. No. 7,813,870.

(51) Int. Cl.

| | |
|---|---|
| ***G06F 19/00*** | (2011.01) |
| ***G06G 7/70*** | (2006.01) |
| ***G06G 7/76*** | (2006.01) |
| ***G08G 1/00*** | (2006.01) |

(52) U.S. Cl.
USPC ...................... 701/117; 701/119; 340/995.13

(58) Field of Classification Search
USPC ............................. 701/117, 119; 340/995.13
See application file for complete search history.

(56) References Cited

U.S. PATENT DOCUMENTS

| | | | | |
|---|---|---|---|---|
| 3,582,620 | A | 6/1971 | Noetinger | 235/150.24 |
| 3,626,413 | A | 12/1971 | Zachmann | 343/8 |
| 4,866,438 | A | 9/1989 | Knisch | 340/936 |

(Continued)

FOREIGN PATENT DOCUMENTS

| | | |
|---|---|---|
| DE | 100 63 763 | 7/2002 |
| DE | 102004 015880 | 11/2004 |

(Continued)

OTHER PUBLICATIONS

"Dash Express Automotive Navigation System," retrieved Aug. 3, 2007, from http://www.dash.net/product.php, 1 page.

(Continued)

*Primary Examiner* — Khoi Tran
*Assistant Examiner* — Jaime Figueroa
(74) *Attorney, Agent, or Firm* — Seed IP Law Group PLLC

(57) ABSTRACT

Techniques are described for generating predictions of traffic conditions at one or more indicated times, such as by using probabilistic techniques to assess various input data while producing predictions for each of one or more road segments (e.g., in a real-time manner based on changing current conditions for a network of roads in a given geographic area). In some situations, one or more predictive Bayesian models and corresponding decision trees are automatically created for use in generating the traffic condition predictions for each geographic area of interest, such as based on observed historical traffic conditions for those geographic areas. Predicted traffic condition information may then optionally be used in a variety of ways to assist in travel and for other purposes, such as to plan optimal routes through a network of roads based on predictions about traffic conditions for the roads at multiple times.

35 Claims, 13 Drawing Sheets

(56) References Cited

U.S. PATENT DOCUMENTS

| | | | | |
|---|---|---|---|---|
| 4,985,705 | A | 1/1991 | Stammler | 342/69 |
| 5,289,183 | A | 2/1994 | Hassett et al. | 340/905 |
| 5,337,082 | A | 8/1994 | Fredericks | 342/69 |
| 5,465,289 | A | 11/1995 | Kennedy, Jr. | 379/59 |
| 5,610,821 | A | 3/1997 | Gazis et al. | 364/444.2 |
| 5,663,720 | A | 9/1997 | Weissman | 340/934 |
| 5,696,502 | A | 12/1997 | Busch et al. | 340/905 |
| 5,745,865 | A | 4/1998 | Rostoker et al. | 701/117 |
| 5,801,943 | A | 9/1998 | Nasburg | |
| 5,827,712 | A | 10/1998 | Yokoyama et al. | 435/193 |
| 6,011,515 | A | 1/2000 | Radcliffe et al. | 342/453 |
| 6,119,013 | A | 9/2000 | Maloney et al. | 455/456 |
| 6,150,961 | A | 11/2000 | Alewine et al. | 340/995 |
| 6,292,742 | B1 | 9/2001 | Heimann et al. | 707/117 |
| 6,317,686 | B1 | 11/2001 | Ran | |
| 6,317,868 | B1 | 11/2001 | Grimm et al. | |
| 6,401,027 | B1 | 6/2002 | Xu et al. | 701/117 |
| 6,463,382 | B1 | 10/2002 | Bullock | 701/117 |
| 6,480,783 | B1 | 11/2002 | Myr | 701/117 |
| 6,490,519 | B1 | 12/2002 | Lapidot et al. | 701/117 |
| 6,496,773 | B1 | 12/2002 | Olsson | 701/117 |
| 6,505,114 | B2 | 1/2003 | Luciani | 701/117 |
| 6,574,548 | B2 | 6/2003 | DeKock et al. | 701/117 |
| 6,594,576 | B2 | 7/2003 | Fan et al. | 701/117 |
| 6,633,812 | B1 | 10/2003 | Martin et al. | |
| 6,650,948 | B1 | 11/2003 | Atkinson et al. | 700/66 |
| 6,664,922 | B1 | 12/2003 | Fan | 342/357.1 |
| 6,728,628 | B2 | 4/2004 | Peterson | 701/117 |
| 6,781,523 | B2 | 8/2004 | Matsui et al. | 340/910 |
| 6,832,140 | B2 | 12/2004 | Fan et al. | 701/33 |
| 6,862,524 | B1 | 3/2005 | Nagda et al. | 701/209 |
| 6,882,313 | B1 | 4/2005 | Fan et al. | 342/457 |
| 6,922,566 | B2 | 7/2005 | Puranik et al. | 455/456.2 |
| 6,973,319 | B2 | 12/2005 | Ormson | 455/456.1 |
| 6,989,765 | B2 | 1/2006 | Gueziec | 340/905 |
| 7,026,958 | B2 | 4/2006 | Wainfan et al. | 340/995.13 |
| 7,027,915 | B2 | 4/2006 | Craine | 701/117 |
| 7,069,143 | B2 | 6/2006 | Peterson | 701/117 |
| 7,096,115 | B1 | 8/2006 | Groth et al. | 701/117 |
| 7,116,326 | B2 | 10/2006 | Soulchin et al. | 345/440 |
| 7,161,497 | B2 | 1/2007 | Gueziec | 340/905 |
| 7,221,287 | B2 | 5/2007 | Gueziec et al. | 340/905 |
| 7,289,039 | B2 | 10/2007 | Kato et al. | |
| 7,375,649 | B2 | 5/2008 | Gueziec | 340/905 |
| 7,508,321 | B2 | 3/2009 | Gueziec et al. | 340/905 |
| 7,519,564 | B2 | 4/2009 | Horvitz | 706/12 |
| 7,557,730 | B2 | 7/2009 | Gueziec | 340/905 |
| 7,609,176 | B2 | 10/2009 | Yamane et al. | 340/994 |
| 7,610,145 | B2 | 10/2009 | Kantarjiev et al. | 701/204 |
| 7,693,657 | B2 | 4/2010 | Endo et al. | |
| 7,813,870 | B2 | 10/2010 | Downs et al. | 701/117 |
| 7,860,639 | B2 | 12/2010 | Yang | |
| 8,065,073 | B2 * | 11/2011 | Downs et al. | 701/117 |
| 2001/0029425 | A1 | 10/2001 | Myr | |
| 2002/0051464 | A1 | 5/2002 | Sin et al. | 370/466 |
| 2003/0069683 | A1 | 4/2003 | Lapidot et al. | 701/117 |
| 2003/0135304 | A1 | 7/2003 | Sroub et al. | 701/1 |
| 2004/0073361 | A1 | 4/2004 | Tzamaloukas et al. | |
| 2004/0225437 | A1 | 11/2004 | Endo et al. | |
| 2004/0249568 | A1 | 12/2004 | Endo et al. | 701/209 |
| 2005/0027436 | A1 | 2/2005 | Yoshikawa et al. | |
| 2005/0090974 | A1 | 4/2005 | Hirose | |
| 2005/0093720 | A1 | 5/2005 | Yamane et al. | |
| 2005/0096839 | A1 | 5/2005 | Nakano et al. | 701/200 |
| 2005/0140525 | A1 | 6/2005 | Tomita et al. | |
| 2005/0171649 | A1 | 8/2005 | Adachi | |
| 2006/0004511 | A1 | 1/2006 | Yoshikawa et al. | |
| 2006/0074551 | A1 | 4/2006 | Zaitsu et al. | 701/209 |
| 2006/0082472 | A1 | 4/2006 | Adachi et al. | |
| 2006/0103674 | A1 | 5/2006 | Horvitz et al. | 345/629 |
| 2006/0106530 | A1 | 5/2006 | Horvitz et al. | 701/117 |
| 2006/0106599 | A1 | 5/2006 | Horvitz | 704/219 |
| 2006/0122846 | A1 | 6/2006 | Burr et al. | 705/1 |
| 2006/0149461 | A1 | 7/2006 | Rowley et al. | 701/202 |
| 2006/0155464 | A1 | 7/2006 | Smartt | 701/208 |
| 2006/0224797 | A1 | 10/2006 | Parish et al. | 710/62 |
| 2006/0229802 | A1 | 10/2006 | Vertelney et al. | 701/200 |
| 2006/0241987 | A1 | 10/2006 | Pallotto et al. | |
| 2006/0287818 | A1 | 12/2006 | Okude et al. | |
| 2007/0005419 | A1 | 1/2007 | Horvitz et al. | 705/14 |
| 2007/0073477 | A1 | 3/2007 | Krumm et al. | 701/209 |
| 2007/0159355 | A1 | 7/2007 | Kelly et al. | |
| 2007/0199050 | A1 | 8/2007 | Meier | 726/4 |
| 2007/0208492 | A1 | 9/2007 | Downs et al. | 701/117 |
| 2007/0208494 | A1 | 9/2007 | Chapman et al. | 701/117 |
| 2007/0208495 | A1 | 9/2007 | Chapman et al. | 701/117 |
| 2007/0208496 | A1 | 9/2007 | Downs et al. | 701/117 |
| 2007/0208497 | A1 | 9/2007 | Downs et al. | 701/117 |
| 2007/0208498 | A1 | 9/2007 | Barker et al. | 701/117 |
| 2007/0208501 | A1 | 9/2007 | Downs et al. | 701/119 |
| 2008/0021791 | A1 | 1/2008 | Steelberg et al. | 705/26 |
| 2008/0046165 | A1 | 2/2008 | Downs et al. | 701/117 |
| 2008/0059115 | A1 | 3/2008 | Wilkinson | 702/179 |
| 2008/0071465 | A1 | 3/2008 | Chapman et al. | 701/117 |
| 2008/0071466 | A1 | 3/2008 | Downs et al. | 701/117 |
| 2008/0133517 | A1 | 6/2008 | Kapoor et al. | 707/6 |
| 2008/0275309 | A1 | 11/2008 | Stivoric et al. | 600/300 |
| 2008/0278328 | A1 | 11/2008 | Chand et al. | 340/572.1 |
| 2009/0118996 | A1 | 5/2009 | Kantarjiev et al. | 701/119 |

FOREIGN PATENT DOCUMENTS

| | | | |
|---|---|---|---|
| DE | 103 36 590 | | 2/2005 |
| JP | 11-316126 | A | 11/1999 |
| JP | 2001-227977 | A | 8/2001 |
| JP | 2003-151079 | A | 5/2003 |
| JP | 2004-347448 | A | 12/2004 |
| JP | 2006-17607 | A | 1/2006 |
| JP | 2006-90872 | | 4/2006 |
| WO | 2004/021305 | | 3/2004 |
| WO | 2004/021306 | | 3/2004 |
| WO | 2006/005906 | | 1/2006 |

OTHER PUBLICATIONS

"Dash Navigation Unveils First Internet-Connected Auto Navigation Device," Sep. 26, 2006, Dash Navigation™, Inc., retrieved Aug. 3, 2007, from http://www.dash.net/news_pr-060925.php, 1 page.

"Inrix Advances Navigation with 'Nationwide Average Speeds'," Aug. 7, 2006, Inrix, Inc., retrieved Jul. 19, 2007, from http://www.inrix.com/news_NationwideAverageSpeeds_07Aug2006.asp, 1 page.

"INRIX Historical Traffic Improves Consumer Navigation Experience," Jul. 18, 2007, Inrix, Inc., retrieved Jul. 19, 2007, from http://www.inrix.com/news_NAS_18July2007.asp, 2 pages.

"LandSonar, Inc. Announces First-Ever Nationwide Traffic-Prediction Product," Jan. 22, 2006, LandSonar, Inc., retrieved Jul. 20, 2007, from http://www.landsonar.com/?p=55, 3 pages.

"NAVTEQ Launches NAVTEQ Traffic Patterns™ Database: *Historic Traffic Data is the Basis for Predicting Traffic Behavior and Enhancing Routes*," Jan. 5, 2007, NAVTEQ, retrieved Jul. 19, 2007, from http://www.navteq.com/webapps/NewsUserServlet?action=NewsDetail&newsId=479, 2 pages.

"TrafficCast International and LandSonar Introduce LPS Plus," Mar. 1, 2007, LandSonar, Inc., retrieved Jul. 19, 2007, from http://www.landsonar.com/?p=117, 2 pages.

"About LandSonar, Inc.," retrieved Apr. 27, 2006, from http://www.landsonar.com/?page_id=2, 2 pages.

"Award Abstract—#0349460—SBIR Phase II: Animated Real-Time Road Traffic Visualization for Broadcast and the Internet," National Science Foundation, retrieved Jul. 31, 2006, from http://www.nsf.gov/awardsearch/showAward.do?AwardNumber=0349460, 2 pages.

"Global Positioning Systems > Tracking Systems in the Yahoo! Directory," Yahoo!® Small Business Directory, retrieved Feb. 8, 2006, from http://dir.yahoo.com/Business_and_Economy/Business_to_Business/Navigation/Global_Positioning_Systems/Tracking_Systems, 8 pages.

"Powerful Tool Crunches Commutes," Mar. 8, 2005, National Science Foundation, retrieved Jan. 20, 2006, from http://www.beatthetraffic.com/aboutus/nsf20050308.htm, 2 pages.

(56) References Cited

OTHER PUBLICATIONS

"Seattle Area Traffic—Central Puget Sound Travel Times," Washington State Department of Transportation, retrieved Jan. 20, 2006, from http://www.wsdot.wa.gov/traffic/seattle/traveltimes/, 3 pages.
"Technology Overview," retrieved Apr. 27, 2006, from http://www.landsonar.com/?page_id=20, 3 pages.
BeatTheTraffic.com: The Right Traffic at the Right Time™, Homepage, retrieved Jan. 20, 2006, from http://www.beatthetraffic.com/, 1 page.
Graham-Rowe, D., "Smart Traffic Forecast Offers Seven-Day Predictions," Jun. 29, 2005, NewScientist.com, retrieved Jan. 20, 2006, from http://www.newscientist.com/article.ns?id=dn7605 &print=true, 2 pages.
Green, D., "Navigating by Phone," Apr. 28, 2004, Palo Alto Weekly Online Edition, retrieved Jul. 27, 2006, from http://www.paloaltoonline.com/weekly/morgue/2004/2004_04_28.zipdash28ja.shtml, 3 pages.
Slawski, W., "Ending Gridlock with Google Driving Assistance (Zipdash Re-Emerges)," Jul. 6, 2006, retrieved Jul. 27, 2006, from http://www.seobythesea.com/?p=240, 3 pages.
Smith, B. "OmniTRACS Keeps on Trucking," Dec. 1, 2005, WirelessWeek.com, retrieved Feb. 7, 2006, from http://www.wirelessweek.com/index.asp?layout=articlePrint&articleID=CA6287997, 2 pages.
Utter, D., "Google Mobilizes Traffic Data," Jul. 25, 2006, webpronews.com, retrieved Jul. 27, 2006, from http://www.webpronews.com/topnews/topnews/wpn-60-20060725GoogleMobilizesTrafficData.html, 3 pages.

* cited by examiner

210

| | Variable | Possible Values |
|---|---|---|
| 214a | IsSchoolDay | true, false |
| 214b | Precipitation | none, low, medium, high |
| 214c | StadiumXEvtType | none, football, concert, soccer, other |
| 214d | PercentBlackSegmentXT-Y | [0, 1.0] |
| 214e | BlackStartSegmentX | notblack, 0, 5, 10, 15, ..., 30 |
| 214f | SegmentXColorT0 | green, yellow, red, black |
| 214g | ... | ... |

(212a: Variable column; 212b: Possible Values column)

Fig. 2B

220

Input Variables (222a–222e); Output Variables (222f–222j)

| | IsSchool Day (222a) | Precip-itation | StadiumX EvtType (222b) | PercentBlack SegmentXT-Y (222c) | ... (222d) | BlackStart SegmentN (222e) | Segment1 ColorT0 (222f) | Segment2 ColorT0 (222g, 222h) | ... (222i) | SegmentN ColorT0 (222j) |
|---|---|---|---|---|---|---|---|---|---|---|
| 224a | true | none | soccer | 0.22 | | 0 | red | black | | yellow |
| 224b | true | none | football | 0.05 | | notblack | green | red | | green |
| 224c | false | low | none | 0.13 | | 15 | green | black | | black |
| 224d | false | medium | concert | 0.07 | | 10 | yellow | yellow | | red |
| 224e | false | high | other | 0.11 | | 5 | green | green | | yellow |
| 224f | | | | | | | | | | |
| 224g | true | none | none | 0.16 | | notblack | green | green | | black |

Fig. 2C

Example Decision Tree for Segment1 at Current Time T0

Example Decision Tree for Segment2 at Current Time T0

Alternative Example Decision Tree for Segment1 at Current Time T0

DYNAMIC PREDICTION OF ROAD TRAFFIC CONDITIONS

CROSS-REFERENCE TO RELATED APPLICATIONS

This application is a continuation-in-part of co-pending U.S. patent application Ser. No. 12/897,621, filed Oct. 4, 2010 and entitled "Dynamic Time Series Prediction Of Future Traffic Conditions," which is hereby incorporated by reference in its entirety. U.S. patent application Ser. No. 12/897,621 is a continuation of U.S. application Ser. No. 11/367,463, filed Mar. 3, 2006 and entitled "Dynamic Time Series Prediction of Future Traffic Conditions," now U.S. Pat. No. 7,813,870, which is also hereby incorporated by reference in its entirety.

TECHNICAL FIELD

The following disclosure relates generally to techniques for predicting road traffic conditions, such as in a probabilistic manner based on current and past conditions, so as to improve travel over one or more roads.

BACKGROUND

As road traffic has continued to increase at rates greater than increases in road capacity, the effects of increasing traffic congestion have had growing deleterious effects on business and government operations and on personal well-being. Accordingly, efforts have been made to combat the increasing traffic congestion in various ways, such as by obtaining and providing information about current traffic conditions to individuals and organizations. One source for obtaining information about current traffic conditions in some larger metropolitan areas is networks of traffic sensors capable of measuring traffic flow for various roads in the area (e.g., via sensors embedded in the road pavement), and such current traffic condition information may be provided to interested parties in various ways (e.g., via frequent radio broadcasts, an Internet Web site that displays a map of a geographical area with color-coded information about current traffic congestion on some major roads in the geographical area, information sent to cellular telephones and other portable consumer devices, etc.). However, while such current traffic information provides some benefits in particular situations, a number of problems exist with such information.

Accordingly, limited attempts have been made to estimate and provide information about possible traffic conditions, but such attempts have typically suffered from inaccuracies in the estimates, as well as various other problems. For example, some efforts to provide information about possible traffic conditions have merely calculated and provided historical averages of accumulated data. While such historical averages may occasionally produce information for a particular place at a particular day and time that is temporarily similar to actual conditions, such historical averages cannot adapt to reflect specific current conditions that can greatly affect traffic (e.g., weather problems, traffic accidents, current road work, non-periodic events with large attendance, etc.), nor can they typically accommodate general changes over time in the amount of traffic, and thus such estimated information is typically inaccurate and of little practical use for planning purposes.

BRIEF DESCRIPTION OF THE DRAWINGS

FIGS. 2A-2H illustrate various graphical representations of predictive models for representing knowledge about traffic conditions in a given geographic area.

DETAILED DESCRIPTION

Figure 1:
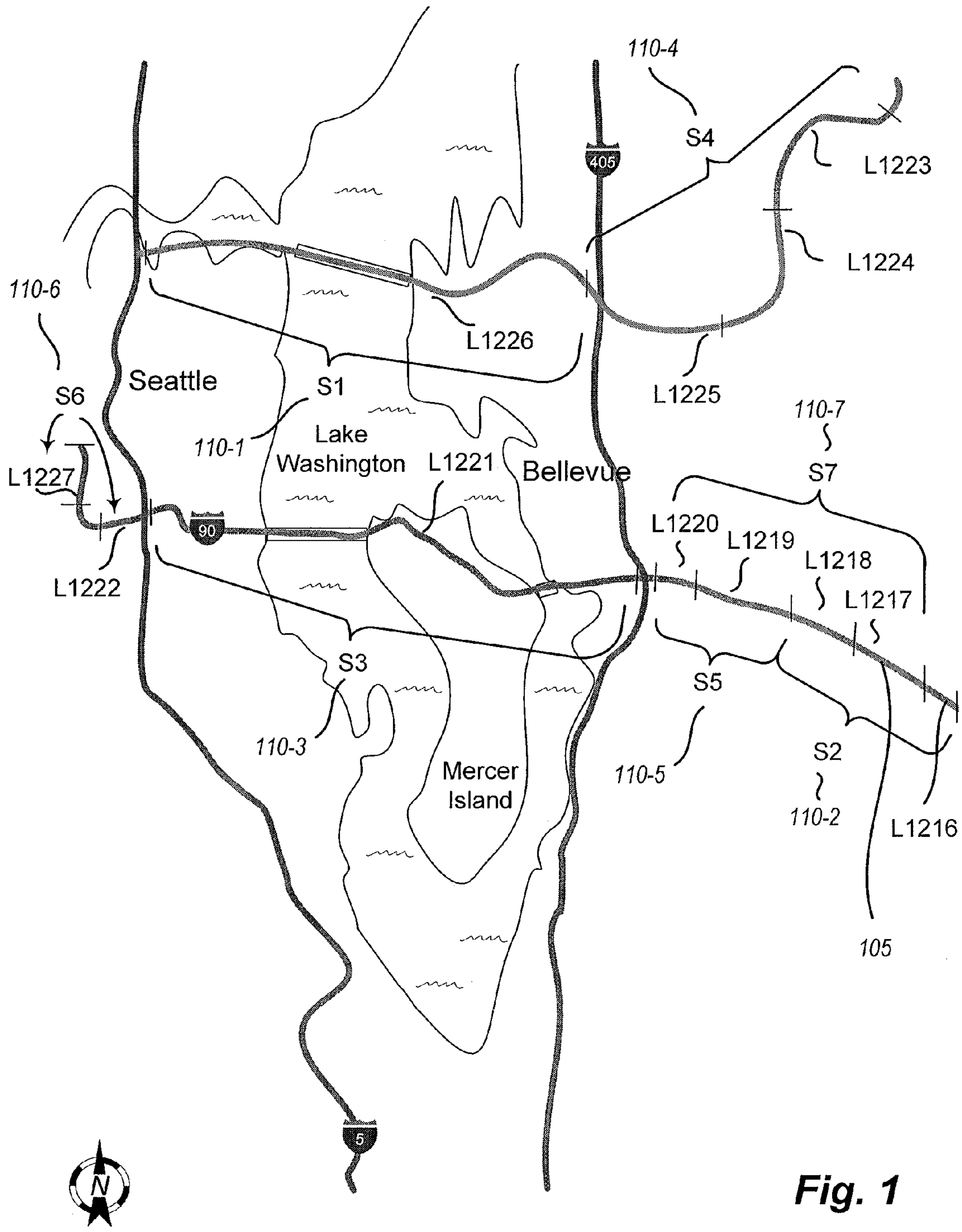
FIG. 1 illustrates an example map with designators indicating a variety of portions of roads of interest.

Techniques are described for generating predictions of traffic conditions that are likely or otherwise expected to occur at indicated times. In some embodiments, the predictions are generated using probabilistic techniques that incorporate various types of input data in order to produce predictions for each of numerous road segments, such as in a real-time manner based on changing current conditions for a network of roads in a given geographic area. Moreover, in at least some embodiments one or more predictive Bayesian or other models are automatically created for use in generating the traffic condition predictions for each geographic area of interest, such as based on observed historical traffic conditions for those geographic areas under varying other conditions at those times. Predicted traffic condition information may be used in a variety of ways to assist in travel and for other purposes, such as to plan optimal routes through a network of roads based on predictions about traffic conditions for the roads. In at least some embodiments, a predictive traffic information provider system uses the described techniques to generate such predictions, as described in greater detail below.

In some embodiments, the types of input data used to generate predictions of traffic conditions may include a variety of current and past conditions, and outputs from the prediction process include the generated predictions of the expected traffic conditions on each of multiple target road segments of interest for each of one or more indicated times (e.g., every 5, 15 or 60 minutes into the future, such as within a pre-determined future time interval like three hours or one day; at a current time for one or more road segments based at least in part on actual current or recent traffic information for other related road segments; etc.), as discussed in greater detail below. For example, types of input data may include the following: information about current and past amounts of traffic for various target road segments of interest in a geographic area, such as for a network of selected roads in the geographic area; information about current and recent traffic accidents; information about current and recent road work; information about current and past weather conditions (e.g., precipitation, temperature, wind direction, wind speed, etc.); information about at least some current and past scheduled events (e.g., type of event, expected start and end times of the event, and/or a venue or other location of the event, etc., such as for all events, events of indicated types, events that are sufficiently large, such as to have expected attendance above an indicated threshold (for example, 1000 or 5000 expected attendees), etc.); and information about school schedules (e.g., whether school is in session and/or the location of one or more schools). Moreover, actual and predicted traffic conditions may be measured and represented in one or more of a variety of ways, such as in absolute terms (e.g., average vehicle speed, volume of traffic for an indicated period of time; average occupancy time of one or more traffic sensors, such as to indicate the average percentage of time that a vehicle is over or otherwise activating the sensor; one of multiple enumerated levels of roadway congestion, such as measured based on one or more other traffic condition measures; etc.) and/or in relative terms (e.g., to represent a difference from typical or from maximum). In addition, while in some embodiments the times at which traffic conditions are predicted are each points in time, in other embodiments such predictions may instead represent multiple time points (e.g., a period of time), such as by representing an average or other aggregate measure of the traffic conditions during those multiple time points. Furthermore, some or all of the input data may be known and represented with varying degrees of certainty, and additional information may be generated to represent degrees of confidence in and/or other metadata for the generated predictions. In addition, the prediction of traffic conditions may be initiated for various reasons and at various times, such as in a periodic manner (e.g., every five minutes), when any or sufficient new input data is received, in response to a request from a user, etc.

Some of the same types of input data may be used to similarly generate longer-term forecasts of future traffic conditions (e.g., one week in the future, or one month in the future) in some embodiments, but such longer-term forecasts may not use some of the types of input data, such as information about some types of current conditions at the time of the forecast generation (e.g., current traffic, weather, or other conditions). In addition, such longer-term forecasts may be generated less frequently than shorter-term predictions, and may be made so as to reflect different time periods than for shorter-term predictions (e.g., for every hour rather than every 15 minutes).

The roads and/or road segments for which traffic condition predictions and/or forecasts are generated may also be selected in various manners in various embodiments. In some embodiments, traffic condition predictions and/or forecasts are generated for each of multiple geographic areas (e.g., metropolitan areas), with each geographic area having a network of multiple inter-connected roads—such geographic areas may be selected in various ways, such as based on areas in which current traffic condition information is readily available for at least some road segments (e.g., based on networks of road sensors for at least some of the roads in the area) and/or in which traffic congestion is a significant problem. In some such embodiments, the roads for which traffic condition predictions and/or forecasts are generated include those roads for which current traffic condition information is readily available, while in other embodiments the selection of such roads may be based at least in part on one or more other factors (e.g., based on size or capacity of the roads, such as to include freeways and major highways; based on the role the roads play in carrying traffic, such as to include arterial roads and collector roads that are primary alternatives to larger capacity roads such as freeways and major highways; based on functional class of the roads, such as is designated by the Federal Highway Administration; etc.). In other embodiments, traffic condition predictions and/or forecasts may be made for a single road, regardless of its size and/or inter-relationship with other roads. In addition, segments of roads for which traffic condition predictions and/or forecasts are generated may be selected in various manners, such as to treat each road sensor as a distinct segment; to group multiple road sensors together for each road segment (e.g., to reduce the number of independent predictions and/or forecasts that are made, such as by grouping specified numbers of road sensors together); to select road segments so as to reflect logically related sections of a road in which traffic conditions are typically the same or sufficiently similar (e.g., strongly correlated, such as above a correlation threshold), such as based on traffic condition information from traffic sensors and/or from other sources (e.g., data generated from vehicles and/or users that are traveling on the roads, as discussed in greater detail below); etc.

In addition, traffic condition prediction and/or forecast information may be used in a variety of ways in various embodiments, as discussed in greater detail below, including to provide such information to users and/or organizations at various times (e.g., in response to requests, by periodically sending the information, etc.) and in various ways (e.g., by transmitting the information to cellular telephones and/or other portable consumer devices; by displaying information to users, such as via Web browsers and/or application programs; by providing the information to other organizations and/or entities that provide at least some of the information to users, such as third parties that perform the information providing after analyzing and/or modifying the information; etc.). For example, in some embodiments, the prediction and/or forecast information is used to determine suggested travel routes and/or times, such as an optimal route between a starting location and an ending location over a network of roads and/or an optimal time to perform indicated travel, with such determinations based on predicted and/or forecast information at each of one or more times for one or more roads and/or road segments.

For illustrative purposes, some embodiments are described below in which specific types of predictions are generated in specific ways using specific types of input, and in which generated prediction information is used in various specific ways. However, it will be understood that such traffic predictions may be generated in other manners and using other types of input data in other embodiments, that the described techniques can be used in a wide variety of other situations, that future traffic forecasts may similarly be generated and used in various ways, and that the invention is thus not limited to the exemplary details provided.

FIG. 1 illustrates an example map that indicates example road links and road segments (or "traffic segments") for the purpose of discussion, with the example map indicating a geographic area around the cities of Seattle and Bellevue in Washington state of the United States. In this example, several major roads are displayed, including Interstates 5 and 405 that each runs roughly north-south, and Interstate 90 and Washington State Highway 520 that each runs roughly east-west. Portions of the roads are divided into example road links and road segments for illustrative purposes, although it will be understood that such roads may be divided into different road links and/or road segments in other embodiments.

In this example, an area of Interstate 90 east of Interstate 405 is divided into multiple road links L1216-L1220, which are grouped into 3 road segments S5 110-5, S2 110-2, and S7 110-7. For example, road link 1217 105 is a bi-directional link that corresponds to both eastbound and westbound traffic, and thus is part of two road segments 110 that each correspond to one of the directions, with example road segment S7 corresponding to westbound traffic and including the westbound traffic of link L1217 (as well as the westbound traffic of links L1218-L1220), and with example road segment S2 corresponding to eastbound traffic and including the eastbound traffic of link L1217 (as well as the eastbound traffic of adjacent links L1216 and L1218). For the purposes of this example, other road links may be part of a single bi-directional road segment, such as for road segments S1 110-1, S3

110-3, S4 110-4 and S6 110-6. Road links and road segments may have various relationships in various embodiments, such as with several road segments that each correspond to multiple contiguous road links (e.g., road segment S4 and road links L1223-L1225, road segment S7 and road links L1217-L1220, road segment S5 and road links L1219-L1220, etc.), with road link L1221 and road segment S3 corresponding to the same portion of road and with road link L1226 and road segment S1 corresponding to the same portion of road, with road segment S6 corresponding to non-contiguous road links L1227 and L1222, etc. For example, road links L1222 and L1227 may have similar traffic flow characteristics so as to be grouped together in one road segment, such as may be determined automatically or manually in particular embodiments. Also, for ease of illustration, only one link and/or segment designator per physical road portion and direction is shown, but as noted in greater detail elsewhere, each lane or subsets of lanes may be assigned one or more unique link and/or section designators in some embodiments. Similarly, each direction of traffic for a bi-directional road portion may be assigned one or more unique link and/or section designators. In addition, while various road links are of differing lengths in this example embodiment, in other embodiments the road links may all be the same length.

Relationships between road links and road segments may be determined in various ways. For example, for the purposes of predicting road traffic conditions, different road segments may be related to each other in different manners in different situations. Consider a situation in which the morning commute along Interstate 90 is predominantly in a westbound direction into Seattle—in that situation, road traffic on road segments S7 and S3 may be highly correlated, such that a knowledge of current road traffic conditions on one of those two road segments may be relevant in predicting current and/or near-term future traffic conditions on the other road segment. However, in the same situation, road segments S3 may not be significantly related to road segments S5 or S2, despite road segments S3 and S5 being adjacent, if there is not a high degree of correlation between the traffic on those road segments (e.g., if eastbound traffic on S3 predominantly turns north on Interstate 405, S3 and a corresponding road segment on northbound Interstate 405, not shown, may be highly correlated in that situation). Conversely, if the evening commute along Interstate 90 is predominantly in an eastbound direction away from Seattle, road segments S3 may be highly correlated with one or both of the road segments S5 and S2 in situation. In addition, in some situations, road segments may be highly correlated with respect to road traffic conditions despite not being adjacent or even part of the same road or directly connected. For example, road segments S3 and S1 in this example correspond to two primary alternatives for moving between the east and west sides of Lake Washington. As such, in some traffic situations (e.g., heavy traffic situations, such as when levels of congestion prevent free flow of traffic; situations in which tolls on one of the roads are above a defined threshold; etc.), road segments S3 and S1 may be highly correlated with respect to road traffic conditions, such that a knowledge of current road traffic conditions on one of those two road segments may be relevant in predicting current and/or near-term future traffic conditions on the other road segment. Conversely, in other traffic situations (e.g., low traffic situations, such as when levels of congestion do not prevent free flow of traffic; situations in which tolls on one of the roads are not above a defined threshold; etc.), road segments S3 and S1 may not be highly correlated with respect to road traffic conditions, such that a knowledge of current road traffic conditions on one of those two road segments is not relevant in predicting current and/or near-term future traffic conditions on the other road segment.

It will be appreciated that particular examples of related traffic segments and possible reasons for the relationships have been illustrated to enhance understanding. However, as described in greater detail herein, in at least some embodiments the determination of particular road segments that are sufficiently related for predictive purposes in particular situations are automatically determined based on statistical correlations or other statistical relationships.

FIGS. 2A-2H illustrate various graphical representations of example predictive models for representing knowledge about traffic conditions in a given geographic area. In some embodiments, such predictive models are automatically generated, maintained, and utilized to make predictions and/or forecasts regarding traffic conditions at one or more indicated times, such as to predict road traffic conditions data for each road segment of interest. Such predictive models may include, but are not limited to, Bayesian or belief networks, decision trees, hidden Markov models, autoregressive trees, and neural networks. Some such predictive models may be probabilistic models, such as Bayesian network models, and such predictive models may be stored as part of one or more data structures on one or more computer-readable media.

FIGS. 2A-2D illustrate an example of the generation of a Bayesian network for representing probabilistic knowledge about traffic conditions. A Bayesian network is a directed acyclic graph ("DAG") consisting of nodes and edges. The nodes in the graph represent random variables, which may have discrete or continuous values that represent states in the domain being modeled. The edges in the graph represent dependence relationships between the variables. Nodes with no parents are root nodes. The probability distributions of root nodes are unconditional on any other nodes in the graph. A node with one or more parents has a probability distribution that is conditional on the probabilities of its parent nodes. By specifying the prior probabilities of the root nodes and the conditional probabilities of the non-root nodes, a Bayesian network graph can represent the joint probability distribution over all of the variables represented by nodes in the graph.

Figure 2A:
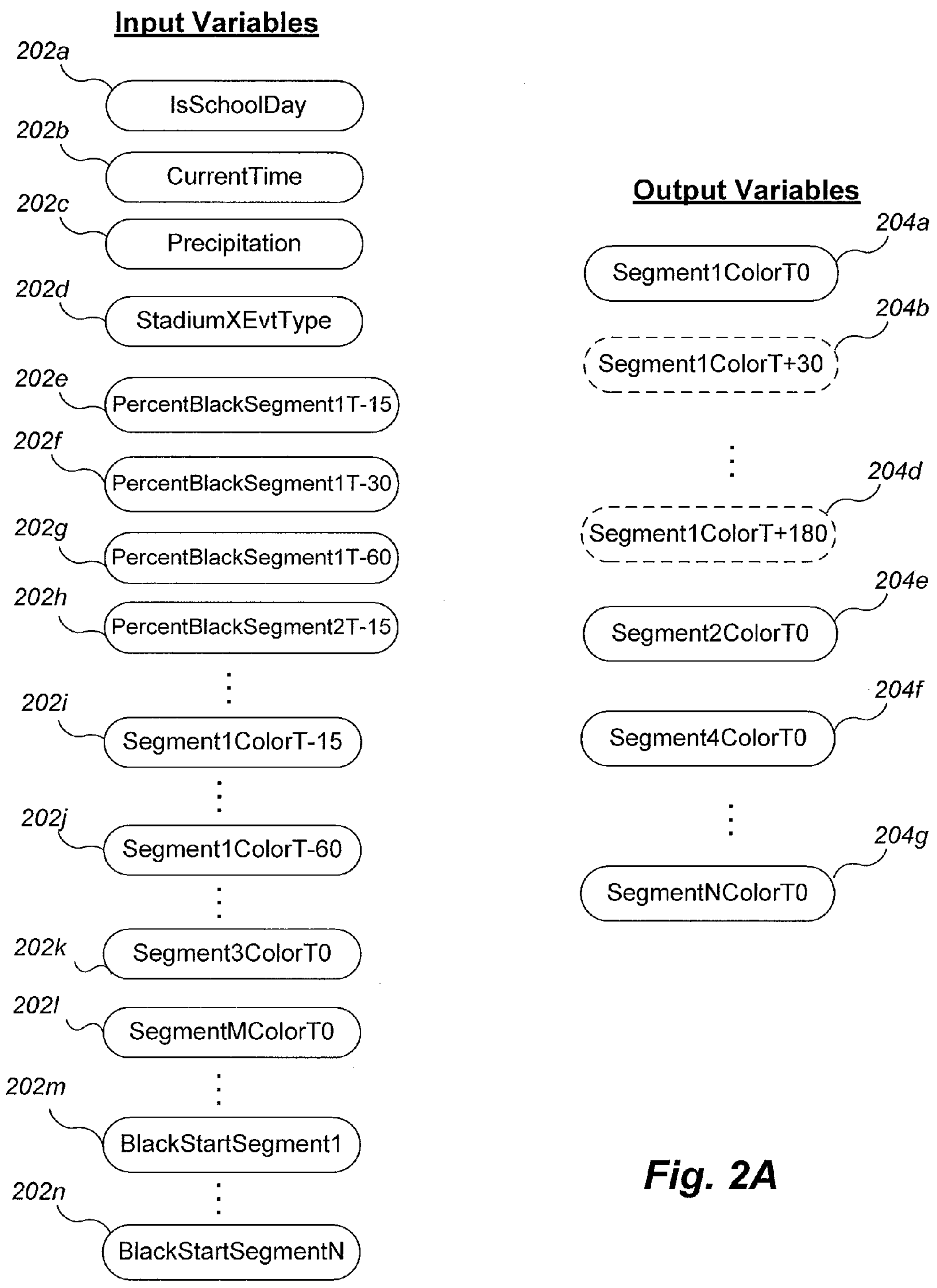

FIG. 2A illustrates an example collection of nodes that may be used to generate a Bayesian network predictive model for use in predicting traffic conditions. The illustrated nodes correspond to variables for which observed input data may be received, and to traffic conditions predictions that may be output with respect to a particular geographic area. In particular, nodes 202*a-n* represent various input variables for use in the predictive model, which in this example will correspond to root nodes in the Bayesian network that will be generated. The example input variables are as follows. Node 202*a* labeled IsSchoolDay may be used to represent whether school is in session on a particular day. Node 202*b* labeled CurrentTime may be used to represent the time of day. Node 202*c* labeled Precipitation may be used to represent an amount of precipitation over a particular time interval (e.g., the past 6 hours) or alternatively a current rate of precipitation. Node 202*d* labeled StadiumXEvtType may be used to represent the type of event (if any) that is scheduled for or currently taking place at stadium X. Nodes 202*e-n* may each be used to represent information of a particular type about the traffic conditions on a particular road segment at the present time or at some time in the past. For example, with respect to nodes 202*e*-202*h*, the nodes each represent the percentage of individual data sources (e.g., traffic sensors or other data sources) for that road segment that are reporting black (e.g., highly congested) traffic conditions at the time being represented, with the corresponding time indicator "T−n" showing an amount of time into the past relative to the current time (e.g., "T−15" represents 15 minutes in the past, "T−30" represents 30 minutes in the past, etc.)—as previously noted, each road segment may be associated with one or more traffic sensors and/or with one or more other sources of traffic condition information for that road segment, as described in greater detail elsewhere. In some embodiments, traffic congestion level data for road segments is represented using colors (e.g., green, yellow, red, black) corresponding to enumerated increasing levels of traffic congestion, with green thus corresponding to the lowest level of traffic congestion and black corresponding to the highest level of traffic congestion, which may be defined to reflect a particular absolute or relative difference in traffic flow for maximum or expected conditions. These nodes in this example are labeled PercentBlackSegmentXT−Y, where X refers to a particular road segment and Y refers to a time in the past (e.g., in minutes, or other unit of time measurement) for which the percentage level of highly congested traffic on that road segment is being reported. For example, node 202*f* labeled PercentBlackSegment1T−30 may be used to represent the percentage of black-level congestion for road segment S1 30 minutes ago. Nodes 202*m-n* in this example may each be used to represent how long the levels of traffic congestion for a particular road segment have been continuously reported as being black, such as to have a value of 10 if the road segment congestion has been black for the last 10 minutes. For example, node 202*m* labeled BlackStartSegment1 may be used to represent how long the level of traffic congestion on road segment S1 has been continuously reported as being black.

Nodes 202*i-l* may each be used to represent the average or most common traffic conditions on a particular road segment at the present time or at some time in the past. These nodes are labeled SegmentXColorT−Y in this example, where X refers to a particular road segment and −Y refers to a time in the past (e.g., in minutes, or other unit of time measurement) at which a particular level of traffic congestion on that road segment has been identified (with the traffic congestion level represented here with its corresponding color), and with "T0" corresponding to the current time. For example, node 202*j* labeled Segment1ColorT−60 may be used to represent the traffic conditions 60 minutes ago on road segment S1, with the level of traffic congestion at that time being illustrated with the appropriate congestion color.

In some situations, current road traffic conditions information may be available for one or more of the road segments, but not for other road segments, such as with current road traffic conditions being available in this example for road segment S3 but not for road segments S1, S2 or S4. Such differences in the availability of current road traffic conditions information for different road segments may, for example, be based at least in part on the availability of functioning road sensors, such as to reflect one or more factors from a group including a particular road segment having road sensors or not, of the road sensors on a particular road segment be functioning or not, of the road sensors on a particular road segment being able to perform real-time or near-real-time reporting or not, etc. In addition, in at least some embodiments, differences in the availability of current road traffic conditions information for different road segments may be based at least in part on the availability of current road conditions data from one or more sources other than functioning road sensors, such as from mobile devices in vehicles that are currently or recently traveling along particular road segments and that have transmission capabilities to provide corresponding data samples in a real-time or near-real-time manner (e.g., within seconds or minutes of data sample acquisition, such as within 10 minutes or 15 minutes), but without having such current road conditions data for other particular road segments. Thus, in this example, road segment S3 may have road sensors that are functioning properly and able to provide real-time or near-real-time road traffic conditions information, while road segments S1, S2 and S4 may not have such properly functioning road sensors with real-time or near-real-time reporting capabilities. Accordingly, the current traffic conditions information for road segment S3 may in some situations be available to be used to predict current traffic conditions information for one or more of road segments S1, S2 and S4, and/or be available to be used to predict future traffic conditions information for road segments S3 and others (e.g., S1, S2 and/or S4). A variety of other input variables may be used in other embodiments, such as to provide additional details related to various of the types of conditions shown or to represent other types of conditions, as discussed in greater detail below.

Nodes 204*a-g* in FIG. 2A represent output variables in the predictive model, and in particular correspond to predictions regarding traffic conditions that may be made given prior probabilities assigned to input nodes 202*a-n* and any current input information for those input nodes. Each output node 204*a*-204*g* in this example is labeled SegmentXColorT+Y, where X refers to a particular road segment and +Y refers to a time for which a particular color corresponding to a level of traffic congestion on that road segment is predicted, and with "T0" again corresponding to the current time. For example, optional node 204*b* labeled Segment1ColorT+30 may be used to represent the predicted traffic conditions on road segment S1 at 30 minutes in the future, while node 204*a* labeled Segment1ColorT0 may be used to represent the predicted traffic conditions on road segment S1 at the current time. In some embodiments, only one of future traffic conditions and current traffic conditions may be predicted. When future traffic conditions are predicted, traffic conditions for a given road segment may be predicted for a number of future times—for example, optional nodes 204*b*-204*d* represent the predicted traffic conditions on road segment S1 at some or all of 15-minute time intervals over a three hour-long time window into the future, although larger or smaller time windows and/or more or less time intervals may be represented.

FIG. 2B illustrates the possible values that may be taken by the variables corresponding to nodes depicted in FIG. 2A. In table 210, column 212*a* lists the variable name and column 212*b* lists the possible values the corresponding variable may take, which may be either continuous or discrete. Rows 214*a-g* each lists an individual variable name and its corresponding range of values. For example, row 214*a* illustrates that the IsSchoolDay input variable may take the values true or false, corresponding to the observation that the current day is a school day or not, while row 214*b* illustrates that the Precipitation input variable may take one of the enumerated values of none, low, medium, or high. In this example, precipitation is measured as a discretized quantity over a fixed time interval for the sake of simplicity, although in other embodiments precipitation may be represented instead in other manners (e.g., as a continuous quantity of rain over a fixed time interval, as a current rate of rainfall, etc.). Row 214*c* illustrates that the StadiumXEvtType input variable may take one of the values none, football, concert, soccer, or other, although in other embodiments the event type may take on a greater or lesser number of possible values (e.g., a Boolean value indicating whether or not there is an event). Row 214*d* illustrates that each PercentBlackSegmentXT−Y input variable may take a real numbered value in the closed interval from 0.0 to 1.0, representing the percentage of data points (e.g., road sensor readings, mobile data source values, etc.) or other sub-segments for the road segment SegmentX on which black traffic congestion level conditions are being reported at the corresponding time −Y minutes in the past. Row 214*e* illustrates that each BlackStartSegmentX input variable may take one of the values notblack, 0, 5, 10, 15, . . . 30, with the "notblack" value indicating that the road segment SegmentX has not had a black traffic congestion level condition in the last 30 minutes, and with the other values indicating the closest number of minutes during the last 30 minutes that black traffic conditions have been continuously reported on the road segment SegmentX prior to the current time. For example, a value of 10 means that black traffic conditions have been continuously reported for approximately the last 10 minutes, and a value of 0 means that black traffic conditions have been continuously reported for zero minutes (or for less than 2½ minutes if time is rounded down) but that black conditions have previously been present during the last 30 minutes (otherwise, the notblack value would be used). Row 214*f* illustrates that the SegmentXColorT0 output variable may take one of the enumerated values green, yellow, red, or black, corresponding to increasing levels of traffic congestion reported on road segment X at the current time. Row 214*g* illustrates that additional possible values for additional variables may be represented.

FIG. 2C illustrates a collection of example data corresponding to observations made regarding traffic conditions in a given geographic area. Each row represents an observation record consisting of related observations for each of multiple of the variables in the predictive model, such as to reflect a particular time or situation. In table 220, columns 222*a*-222*f* correspond to input variables represented by various of nodes 202*a-n* in FIG. 2A and columns 222*g*-222*j* correspond to output variables represented by various of nodes 204*a-g* in FIG. 2A, with some nodes not represented for the sake of clarity. For example, row 224*a* illustrates a first observation record corresponding to an observation at a time at which school was in session; no precipitation had been measured; a soccer event was scheduled to be occurring in stadium X; black traffic congestion level conditions were reported for 22 percent of road segment SegmentX at a time Y minutes ago; and black traffic congestion level conditions were continuously reported on road segment SegmentN for approximately zero minutes. In addition, while the above observations were made, red traffic congestion level conditions occurred on road segment S1; black traffic congestion level conditions occurred on road segment S2; and yellow traffic congestion level conditions occurred on road segment SegmentN. Rows 224*b-g* similarly illustrate additional observation records, and it will be appreciated that actual observation data may include very large numbers of such observations.

Figure 2D:
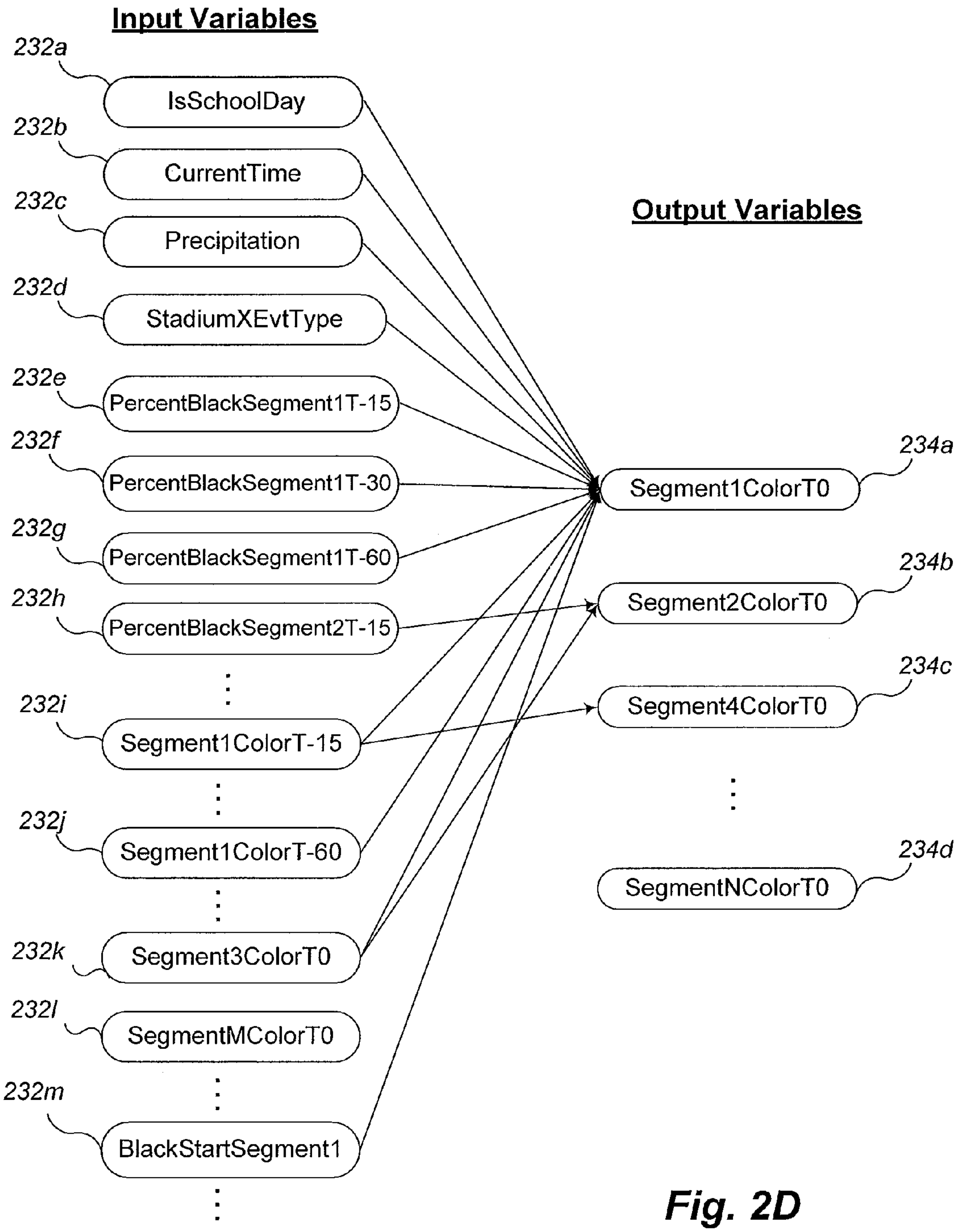

FIG. 2D illustrates an example Bayesian network that may be generated based on observation data such as that illustrated in FIG. 2C, and that may be used as a predictive model for generating traffic conditions predictions. As is shown, the nodes depicted in FIG. 2D represent the same input and output variables as the nodes as in FIG. 2A (with the optional output nodes 204*b*-204*d* not having corresponding nodes in FIG. 2D, and with input node 202*n* not shown), but arcs now connect the input variable nodes 232*a-m* to the output variable nodes 234*a-d*, such that each of the output nodes 234*a*-234*c* is now the child of one or more of the input nodes 232*a-m* corresponding to input variables. If segment N lacks a sufficient correlation or other relationship to any of the available input data, predictions for the current traffic conditions on segment N may not be generated, and other information about possible traffic conditions on segment N may optionally otherwise be determined (e.g., by using historical average traffic conditions for segment N, by obtaining and using actual current real-time data or recent actual data for segment N, etc.). Each arc directed from a parent node to a child node represents dependence between the child node and the parent node, meaning that the observed data from which the Bayesian network structure was generated indicates that the probability of the child node is conditional on the prior probability of its parent node. For example, node 234*c* is shown in this example as having a single parent node 232*i* for the purpose of illustration, which can be understood to mean that the probability of the output variable Segment4ColorT0 represented by node 234*c* is conditional on the prior probability of the Segment1ColorT−15 input variable represented by node 232*i*—thus, when input information is currently obtained for the Segment1ColorT−15 input variable, a predicted value for the traffic congestion level color of road segment S4 at the current time can be determined. However, each output variable will typically be dependent on multiple input variables (e.g., some or all of input variables 232*a*-232*d* and input variables corresponding to recent traffic conditions on that road segment).

If a child node has multiple parent nodes, its probability is conditional on the probabilities of combinations of its multiple parent nodes. For example, output node 234*a* has eleven parent nodes in this example, those being input nodes 232*a*, 232*b*, 232*c*, 232*d*, 232*e*, 232*f*, 232*g*, 232*i*, 232*j*, 232*k* and 232*m*, which can be understood to mean that the probability of the output variable Segment1ColorT0 represented by node 234*a* is conditional on the prior probabilities of the input variable IsSchoolDay represented by node 232*a*, the input variable CurrentTime represented by node 232*b*, the input variable Precipitation represented by node 232*c*, the input variable StadiumXEvtType represented by node 232*d*, the input variable PercentBlackSegment1T−15 represented by node 232*e*, the input variable PercentBlackSegment1T−30 represented by node 232*f*, the input variable PercentBlackSegment1T−60 represented by node 232*g*, the input variable Segment1ColorT−15 represented by node 232*i*, the input variable Segment1ColorT−60 represented by node 232*j*, the input variable Segment3ColorT−0 represented by node 232*k*, and the input variable BlackStartSegment1 represented by node 232*m*. In this example, the output node 234*b* representing the current traffic conditions on segment S2 is also dependent in part on the input variable Segment3ColorT−0 represented by node 232*k*, but the output node 234*c* representing the current traffic conditions on segment S4 is not dependent on that input variable. Thus, in this example and situation, the current traffic conditions on segments S1 and S2 are predicted based in part on the actual current traffic conditions on segment S3, while the prediction of the current traffic conditions on segment S4 is not based on the actual current traffic conditions on segment S3.

Intuitively, the Bayesian network may be understood to represent correlated relationships, which in some cases may include causal relationships. For example, the illustrated Bayesian network expresses correlated relationships between input factors such as school schedules, stadium events, weather, and current and past traffic conditions (as represented by input nodes 232*a-m*) and predicted output traffic conditions on various road segments (as represented by output nodes 234*a-d*). As one specific example, the traffic conditions reported 60 minutes ago on road segment S1 and whether it is a school day may be among the factors that influence the current traffic conditions on road segment S1, as depicted in FIG. 2D by way of arcs from each of node 232*a* labeled IsSchoolDay and node 232*j* labeled Segment1ColorT−60 to node 234*a* labeled Segment1ColorT0.

The structure and probability distributions of a Bayesian network such as that depicted in FIG. 2D may be generated from observation data via learning algorithms that determine the corresponding relationships and values, such as to determine a network structure that best matches the given observation data. In addition, at least some such learning algorithms can proceed with incomplete data (e.g., such as where some of the observation records are missing some data elements), and may further in some embodiments generate more complicated network structures (e.g., by identifying and representing one or more levels of intermediate nodes between the input nodes and output nodes, such as to reflect high-level relationships between groups of input nodes and/or output nodes). Additional details related to one set of example techniques for use in some embodiments for generating a Bayesian network based on observed case information are included in "A Tutorial on Learning Bayesian Networks," David Heckerman, March 1995, Technical Report MSR-TR-95-06 from the Microsoft Research Advanced Technology Division of Microsoft Corporation, which is hereby incorporated by reference in its entirety, and which is available at the current time at ftp:<SLASH><SLASH>ftp<DOT>research <DOT>microsoft<DOT>com<SLASH>pub<SLASH>tr< SLASH>tr-95-06<DOT>pdf, where <DOT> and <SLASH>represent "." and "/", respectively.

FIGS. 2E-2H depict example decision trees that may each be generated based on observation data, such as that illustrated in FIG. 2C and in conjunction with the example Bayesian network illustrated in FIG. 2D, and that may each be used as part of a predictive model for generating traffic conditions predictions for a particular road segment at a particular indicated time. As previously noted, a Bayesian network such as the one depicted in FIG. 2D indicates probabilistic relationships between various variables. A decision tree allows a subset of such relationships to be encoded in a manner that may be used to efficiently compute a predicted value for an output variable given a set of input values. In particular, a decision tree includes numerous decisions arranged in a tree structure, such that possible answers to a decision each lead to a different sub-tree based on that answer, and with the decisions and answers arranged so as quickly split multiple cases with different outcomes into different sub-trees. Given a set of observation data such as that shown in FIG. 2C, decision trees such as those shown in FIGS. 2E-2H may be automatically generated via learning algorithms that determine the best decisions and answers to include in the decision tree and the best structure of the tree to facilitate rapid decisions based on input data to reflect current conditions. Additional details related to one set of example techniques for use in some embodiments for generating decision trees based on observed case information and/or a corresponding Bayesian network are included in "Scalable Classification over SQL Databases," Surajit Chaudhuri et al., Microsoft Research Division of Microsoft Corporation, March 1999, Proceedings of 15th International Conference on Data Engineering, Sydney, Australia, which is hereby incorporated by reference in its entirety, and which is available at the current time at ftp: <SLASH><SLASH>ftp<DOT>research<DOT>microsoft <DOT>com<SLASH>users<SLASH>AutoAdmin< SLASH>icde99<DOT>pdf, where <DOT> represents "." and where <SLASH> represents "/".

In the illustrated embodiment, each decision tree is used to generate the predicted traffic congestion level conditions on a single road segment at a single indicated time given current condition information for input variables. As described in more detail with reference to FIGS. 2A-D, in some embodiments, at each of one or more successive current times, traffic conditions for one or more indicated times are modeled based on the information available at the current time of the modeling, such as to model a single decision tree for the current time and the road segment of interest (and with a distinct decision tree modeled for that road segment and the then-current time at a later successive current time), or to model a distinct decision tree for every 15 minutes of a three-hour future time interval (resulting in twelve decision trees per modeled road segment). In FIGS. 2E-2H, the decision tree nodes are each labeled with a variable name corresponding to one of the input variables described with reference to FIGS. 2A-D, and the arcs emanating from a given node representing an input variable are each labeled with one or more of the possible values that may be taken by the variable. A path is determined by starting at the root node of the tree, using the value in the set of input data corresponding to the variable represented by that node to determine which arc to follow to a child node, and repeating the process for each successive child node along the path until a leaf node is reached. In FIGS. 2E-2H, leaf nodes are rectangular in shape, and each represent a most likely traffic congestion level prediction for the given set of input data.

Figure 2E:
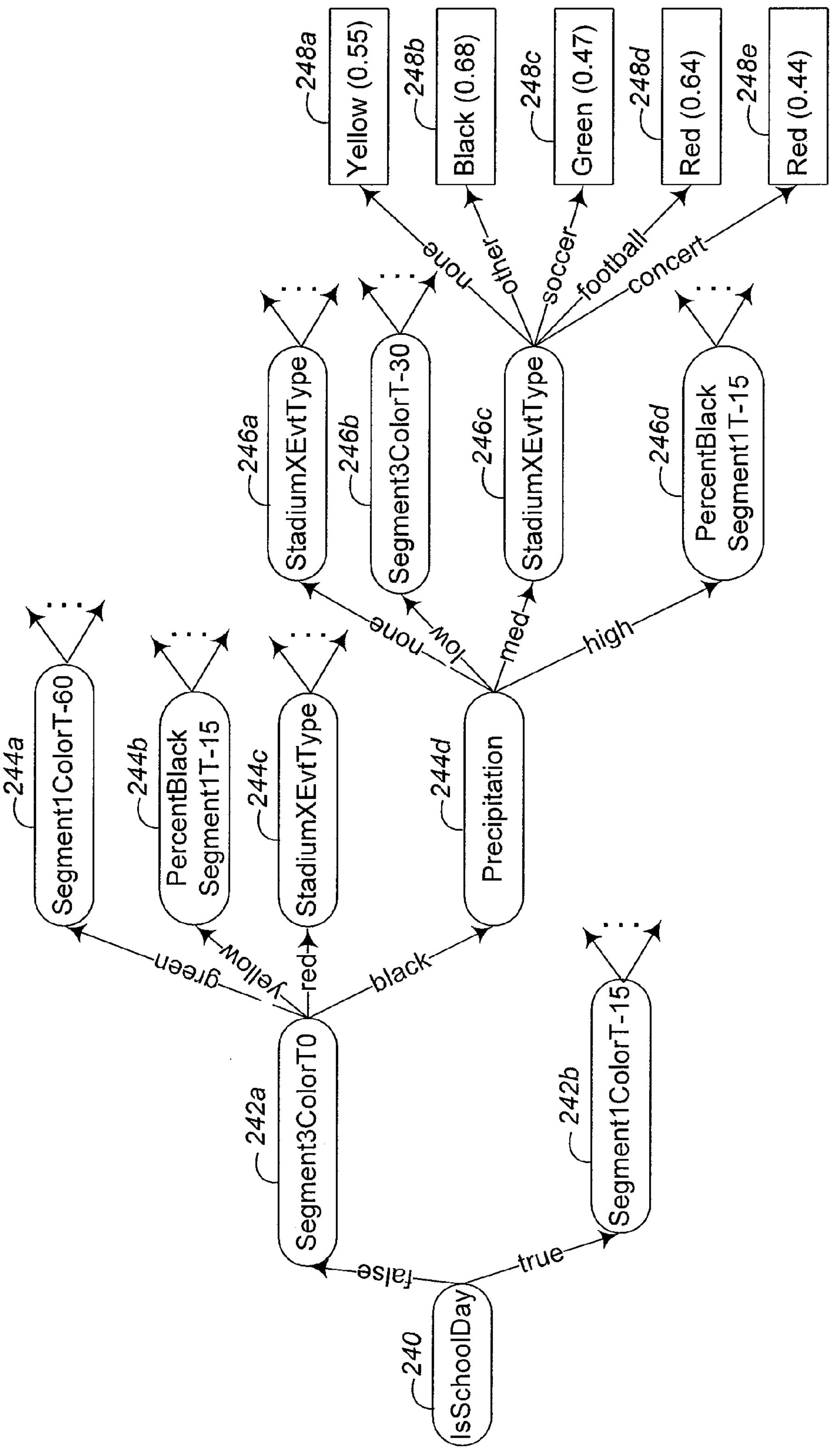

FIG. 2E shows a portion of an example decision tree for predicting traffic congestion levels for road segment S1 at a current time T0, and in particular illustrates a single path from the root node to possible leaf nodes, although it will be understood that in an actual decision tree, numerous other paths will similarly lead to other such possible leaf nodes. In this example, the root node 240 of the illustrated decision tree corresponds to the IsSchoolDay input variable, with the path leading to node 242*b* being followed if it is currently a school day and with the path leading to node 242*a* being followed otherwise. Node 242*a* represents the Segment3ColorT0 input variable, with possible values of the traffic congestion color (e.g., green, yellow, red, black) of road segment S3 at the current time leading to nodes 244*a-d* as shown. For example, if it is currently determined that black traffic conditions are currently present on this road segment, the path to node 244*d* is followed, which represents the Precipitation input variable. Possible values of the Precipitation input variable from node 244*d* lead to nodes 246*a-d* as shown. For example, if the current measured precipitation is medium, the path to node 246*c* is followed, which represents the StadiumXEvtType input variable. Possible values of the StadiumXEvtType input variable lead to leaf nodes 248*a-e* as shown, with each of these leaf nodes representing an associated predicted traffic congestion level on road segment S1 at the current time. In this example, each leaf node is also labeled with a confidence level associated with the predicted traffic congestion level (as shown by the value in parenthesis), such as may be determined in various ways. As one example, node 248*d* indicates that if a football game is currently scheduled, then a red traffic congestion level condition on road segment S1 is predicted for the current time with a confidence level of 64%, while node 248*c* indicates that if a soccer game is instead currently scheduled then green traffic congestion level conditions are predicted on road segment S1 for the current time with a confidence level of 47%. This difference may be attributed, for example, to the relative attendance and corresponding traffic for events of the two sports within the given geographic area, to different schedules (e.g., start, duration or end times) for such types of events, and/or to different patterns of traffic flow before and/or after the event (e.g., concert attendees may tend to arrive and/or depart en masse, whereas sporting event attendees may tend to arrive and/or depart more sporadically over larger time intervals).

Figure 2F:
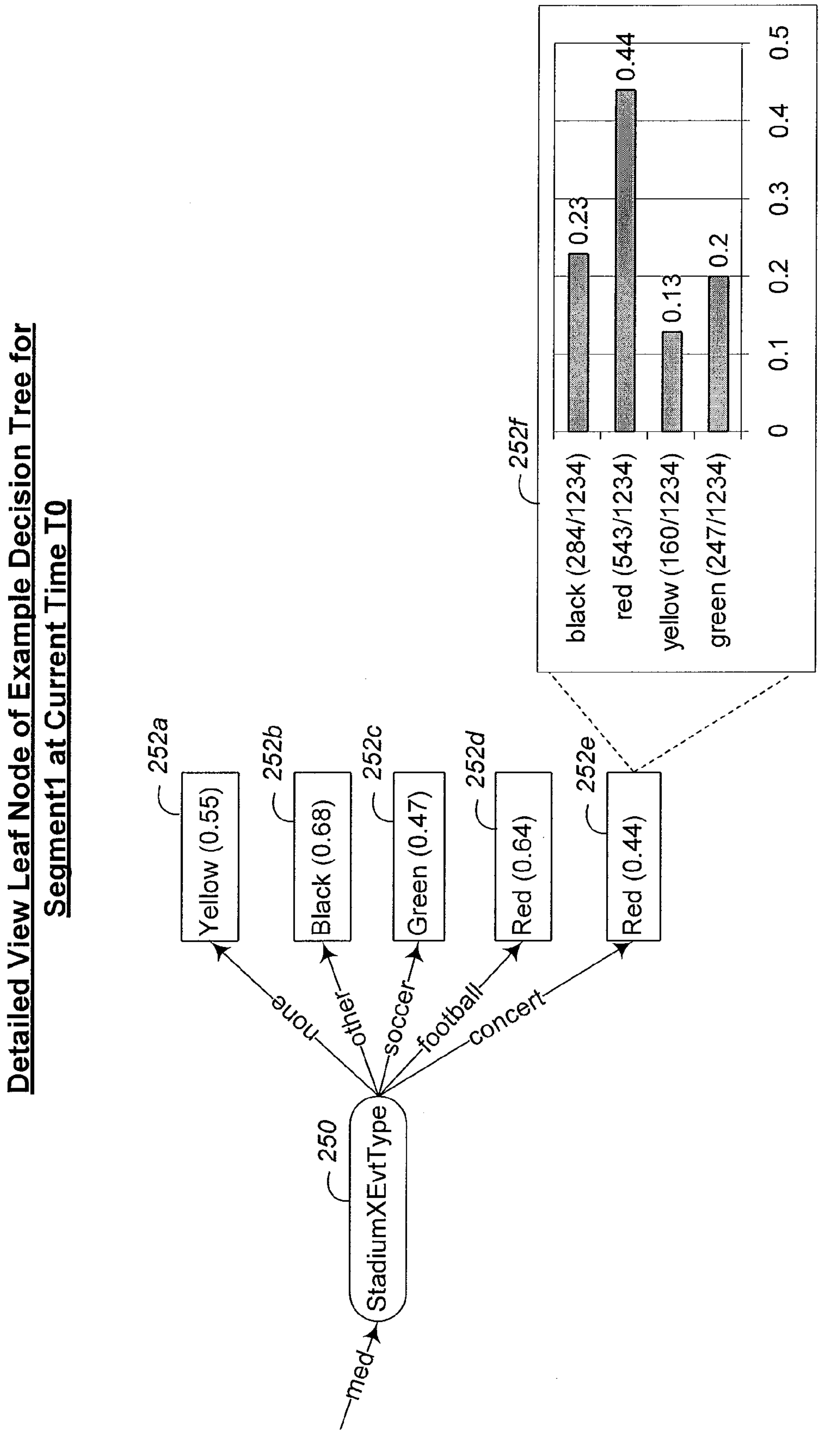

FIG. 2F shows a detailed view of one example leaf node of the example decision tree of FIG. 2E. In particular, a detailed view of leaf node 252*e* is shown, which corresponds to the leaf node 248*e* of FIG. 2E. FIG. 2F shows a histogram 252*f* for node 252*e*, which illustrates a probability distribution over all possible outcomes for node 252*e* in the observed data used to generate the decision tree. In this example, the histogram 252*f* shows the four possible traffic congestion level values (e.g., black, red, yellow, green) and the associated frequency of each value from the observed data. As can be seen from the histogram, the outcome with the highest frequency is a red traffic congestion level, with a frequency of 44% of the observed cases (shown as being the outcome in 543 of 1234 observed cases). In this example, the highest frequency outcome will be selected as the predicted outcome at a particular leaf node, and the frequency of that particular outcome in the observed data will be selected as the confidence value for the prediction. In other embodiments, confidence values may be determined in other manners, such as based on a relationship of the highest frequency outcome to an overall mean, median, or other statistical aggregate measure of the outcomes.

Figure 2G:
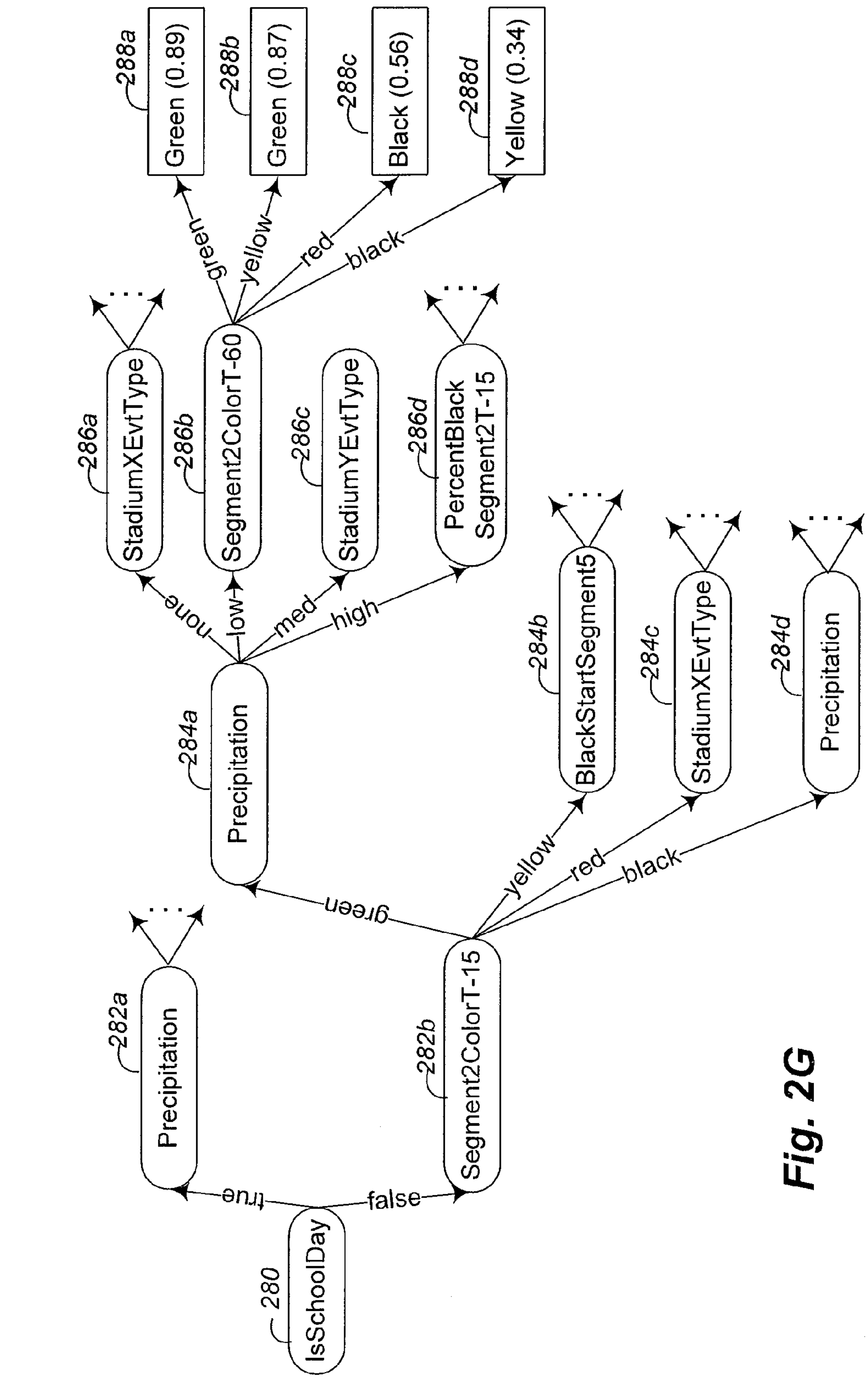

FIG. 2G shows a portion of an example decision tree for predicting traffic congestion levels for road segment S2 at the current time. This decision tree may be used to predict traffic conditions for road segment S2, as opposed to road segment S1 as depicted in FIG. 2E, but otherwise has a similar structure and use as the previously discussed decision trees. Nonetheless, it will be appreciated that the structure of the decision tree for predicting the current traffic conditions of segment S2 is different in this example from the structure of the decision tree for predicting the current traffic conditions of segment S1 (based on differences in the underlying observed historical data used to generate the network of FIG. 2D and the corresponding decision trees of FIGS. 2E and 2G), and that the structure of the decision tree for predicting the current traffic conditions of segment S2 illustrated in FIG. 2G illustrates additional dependencies on input values that were not shown in FIG. 2D for the sake of simplicity. This decision tree of FIG. 2G shows four paths from root node 280 to leaf nodes 288*a-d*, which result in most likely predictions of green, green, black, and yellow traffic congestion level conditions with associated confidence values of 89%, 87%, 56%, and 34%, respectively.

Figure 2H:
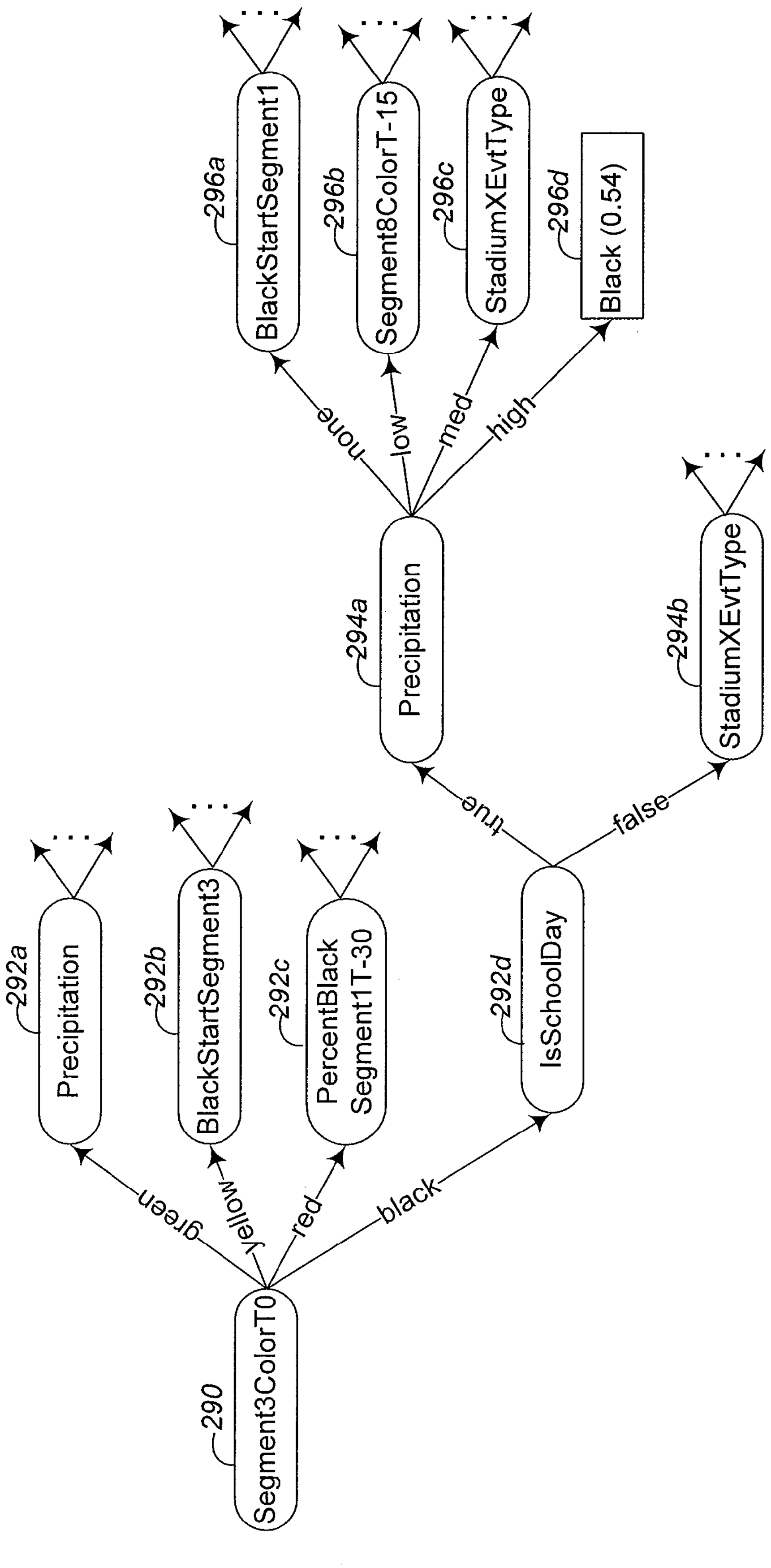

FIG. 2H shows a portion of an alternative example decision tree for predicting road traffic conditions for road segment S1 at a current time, such as may be generated for S1 for a different day and time than that of the decision tree illustrated in FIG. 2E (or otherwise for different current conditions), such that different dependencies and weights are used for the predicting at that different day and time. In the example of FIG. 2H, a particular path is illustrated from root node 290 to a leaf node 296*d* that yields a most likely prediction of black traffic congestion level conditions with an associated confidence value of 54%, if the conditions at the time of use of the alternative decision tree include current black traffic conditions on segment S3, a school day, and high precipitation. As described in more detail elsewhere, in some embodiments such decision trees and/or the associated Bayesian network prediction models are updated and/or re-created at various times, such as when new observed case information becomes available, or for use at different times or otherwise in different situations. These updates may occur at various times, such as on a periodic basis (e.g., weekly, monthly, etc.), upon request, and/or upon the accumulation of sufficient new observed case data. In addition, in some embodiments the new observed case data may merely be used to update the predicted values for existing leaf nodes (e.g., with respect to histogram 252*f* of FIG. 2F, to update that black is now the most frequent outcome for node 252*e* given new observed data based on 1284 of 2334 total occurrences), while in other embodiments the new observed case data is used to generate new decision trees with potentially different structures.

Figure 3:
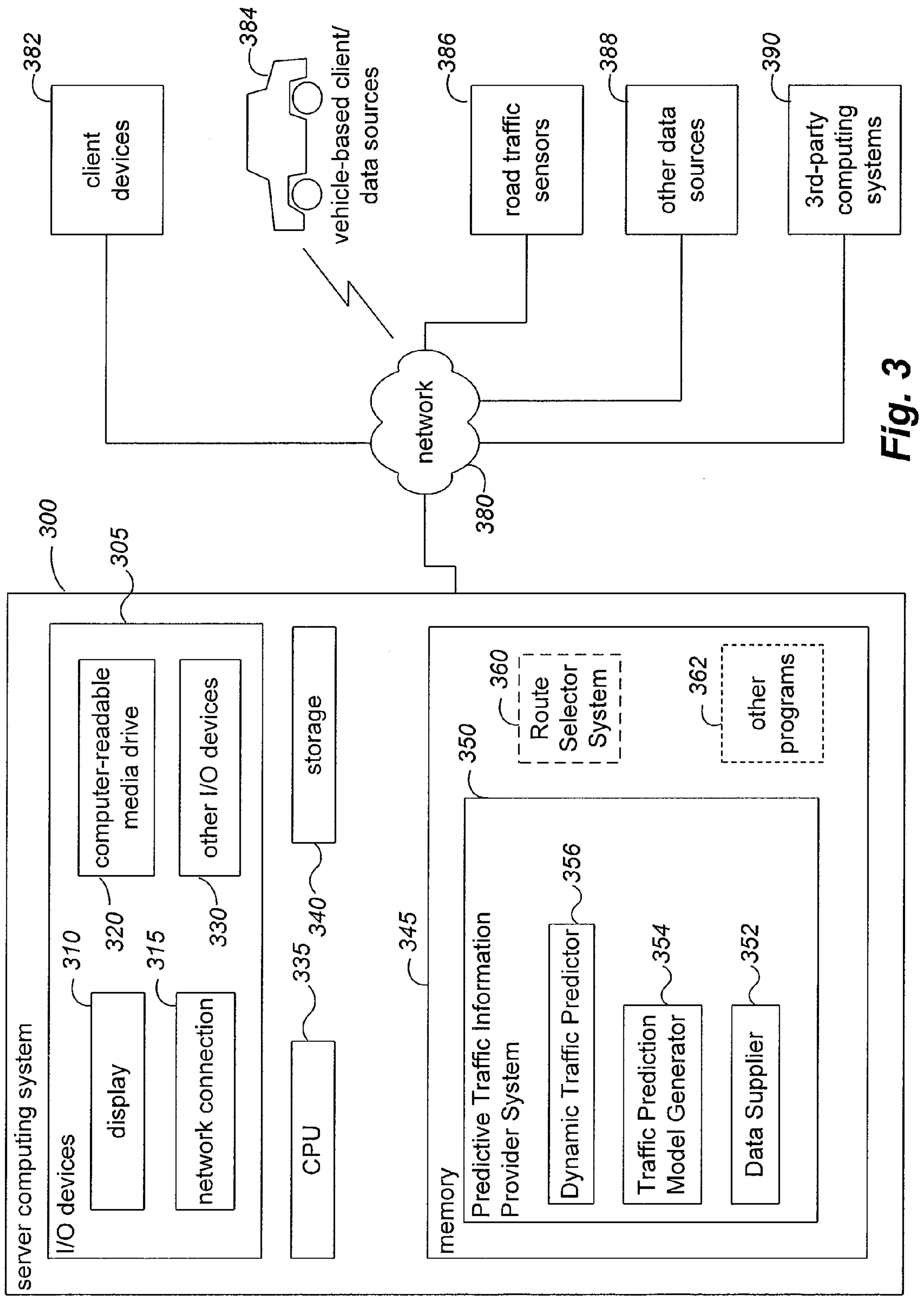
FIG. 3 is a block diagram illustrating a computing system suitable for executing an embodiment of the described Predictive Traffic Information Provider system.

FIG. 3 is a block diagram illustrating an embodiment of a server computing system 300 that is suitable for performing at least some of the described techniques, such as by executing an embodiment of a Predictive Traffic Information Provider system. The server computing system 300 includes one or more central processing unit ("CPU") processors 335, various input/output ("I/O") components 305, storage 340, and memory 345, with the illustrated I/O components including a display 310, a network connection 315, a computer-readable media drive 320, and other I/O devices 330 (e.g., keyboards, mice or other pointing devices, microphones, speakers, etc.).

In the illustrated embodiment, a Predictive Traffic Information Provider system 350, an optional Route Selector system 360, and optional other systems provided by programs 362 are executing in memory 345 in order to perform at least some of the described techniques, with these various executing systems generally referred to herein as predictive traffic information systems. The server computing system and its executing systems may communicate with other computing systems via a network 380 (e.g., the Internet, one or more cellular telephone networks, etc.), such as various client devices 382, vehicle-based clients and/or data sources 384, road traffic sensors 386, other data sources 388, and third-party computing systems 390. In particular, one or more of the predictive traffic information systems receives various information regarding current conditions and/or previous observed case data from various sources, such as from the road traffic sensors, vehicle-based data sources and other data sources. The Predictive Traffic Information Provider system then uses the received data to generate traffic condition predictions for one or more indicated current and/or future times, and provides the predicted information to one or more other recipients, such as the Route Selector system, one or more other predictive traffic information systems, client devices, vehicle-based clients, third-party computing systems, and/or otherwise to users. If the Route Selector system is present and receives such information, it may optionally use the received predicted traffic condition information to generate route-related information, such as for frequently used routes and/or upon request for indicated routes, and similarly may provide such route-related information to one or more other predictive traffic information systems, client devices, vehicle-based clients, and/or third-party computing systems.

The client devices 382 may take various forms in various embodiments, and may generally include any communication devices and other computing devices capable of making requests to and/or receiving information from the predictive traffic information systems. In some cases, the client devices may run interactive console applications (e.g., Web browsers) that users may utilize to make requests for traffic-related information based on predicted traffic information, while in other cases at least some such traffic-related information may be automatically sent to the client devices (e.g., as text messages, new Web pages, specialized program data updates, etc.) from one or more of the predictive traffic information systems.

The road traffic sensors 386 include multiple sensors that are installed in, at, or near various streets, highways, or other roadways, such as for one or more geographic areas. These sensors include loop sensors that are capable of measuring the number of vehicles passing above the sensor per unit time, vehicle speed, and/or other data related to traffic flow. In addition, such sensors may include cameras, motion sensors, radar ranging devices, and other types of sensors that are located adjacent to or otherwise near a roadway. The road traffic sensors 386 may periodically or continuously provide measured data via wire-based or wireless-based data link to the Predictive Traffic Information Provider system 350 via the network 380 using one or more data exchange mechanisms (e.g., push, pull, polling, request-response, peer-to-peer, etc.). In addition, while not illustrated here, in some embodiments one or more aggregators of such road traffic sensor information (e.g., a governmental transportation body that operates the sensors) may instead obtain the raw data and make that data available to the predictive traffic information systems (whether in raw form or after it is processed).

The clients/data sources 384 in this example may each be a mobile computing system or device that provides data to one or more of the predictive traffic information systems and/or that receives data from one or more of those systems, such as for computing systems or devices located within vehicles. In some embodiments, the Predictive Traffic Information Provider system may utilize a distributed network of vehicle-based data sources that provide information related to current traffic conditions for use in traffic prediction. For example, each vehicle may include a GPS ("Global Positioning System") device (e.g., a cellular telephone with GPS capabilities, a stand-alone GPS device, etc.) and/or other geo-location device capable of determining the geographic location, speed, direction, and/or other data related to the vehicle's travel, and one or more devices on the vehicle (whether the geo-location device(s) or a distinct communication device) may from time to time obtain such data and provide it to one or more of the predictive traffic information systems (e.g., by way of a wireless link)—such vehicles may include a distributed network of individual users, fleets of vehicles (e.g., for delivery companies, transportation companies, governmental bodies or agencies, vehicles of a vehicle rental service, etc.), vehicles that belong to commercial networks providing related information (e.g., the OnStar service), a group of vehicles operated in order to obtain such traffic condition information (e.g., by traveling over predefined routes, or by traveling over roads as dynamically directed, such as to obtain information about roads of interest), etc. Moreover, in at least some embodiments other mobile data sources may similarly provide actual data based on travel on the roads, such as based on computing devices and other mobile devices of users who are traveling on the roads (e.g., users who are operators and/or passengers of vehicles on the roads). In addition, such vehicle-based information may be generated in other manners in other embodiments, such as by cellular telephone networks, other wireless networks (e.g., a network of Wi-Fi hotspots) and/or other external systems (e.g., detectors of vehicle transponders using RFID or other communication techniques, camera systems that can observe and identify license plates and/or users' faces) that can detect and track information about vehicles passing by each of multiple transmitters/receivers in the network.

Such generated vehicle-based travel-related information may then be used for a variety of purposes, such as to provide information similar to that of road sensors, but for road segments that do not have functioning road sensors (e.g., for roads that lack sensors, such as for geographic areas that do not have networks of road sensors and/or for arterial roads that are not significantly large to have road sensors, for road sensors that are broken, etc.), to verify duplicative information that is received from road sensors or other sources, to identify road sensors that are providing inaccurate data (e.g., due to temporary or ongoing problems), etc. The wireless links may be provided by a variety of technologies known in the art, including satellite uplink, cellular network, WI-FI, packet radio, etc., although in at least some embodiments such information about road traffic conditions may be obtained from mobile devices (whether vehicle-based devices and/or user devices) via physical download when the device reaches an appropriate docking or other connection point (e.g., to download information from a fleet vehicle once it has returned to its primary base of operations or other destination with appropriate equipment to perform the information download). In some cases, various factors may cause it to be advantageous for a mobile device to store multiple data samples that are acquired over a determined period of time (e.g., data samples taken at a pre-determined sampling rate, such as 30 seconds or a minute) and/or until sufficient data samples are available (e.g., based on a total size of the data), and to then transmit the stored data samples together (or an aggregation of those samples) after the period of time—for example, the cost structure of transmitting data from a vehicle-based data source via a particular wireless link (e.g., satellite uplink) may be such that transmissions occur only after determined intervals (e.g., every 15 minutes), one or more of the geo-location and/or communication devices may be configured or designed to transmit at such intervals, an ability of a mobile device to transmit data over a wireless link may be temporarily lost (e.g., such as for a mobile device that typically transmits each data sample individually, such as every 30 seconds or 1 minute, and possibly due to factors such as a lack of wireless coverage in an area of the mobile device, other activities being performed by the mobile device or a user of the device, or a temporary problem with the mobile device or an associated transmitter) such that storage of data samples will allow later transmission or physical download, etc. For example, if a wireless transmission of up to 1000 units of information costs $0.25 cents, and each data sample is 50 units in size, it may be advantageous to sample every minute and send a data set comprising 20 samples every 20 minutes, rather than sending samples more frequently (e.g., every minute). Moreover, in some embodiments additional information may be generated and provided by a mobile device based on multiple stored data samples. For example, if a particular mobile device is able to acquire only information about a current instant position during each data sample, but is not able to acquire additional related information such as speed and/or direction, such additional related information may be calculated or otherwise determined based on multiple subsequent data samples.

Alternatively, some or all of the clients/data sources 384 may each have a computing system to obtain information from one or more of the predictive traffic information systems, such as for use by an occupant of a vehicle. For example, a vehicle may contain an in-dash navigation system with an installed Web browser or other console application that a user may utilize to make requests for traffic-related information via a wireless link from the Predictive Traffic Information Provider system or the Route Selector system, or instead such requests may be made from a portable device of a user (e.g., a smart phone) in the vehicle. In addition, one or more of the predictive traffic information systems may automatically transmit traffic-related information to such a vehicle-based client device (e.g., updated predicted traffic information and/or updated route-related information) based upon the receipt or generation of updated information.

The other data sources 388 include a variety of types of other sources of data that may be utilized by one or more of the predictive traffic information systems to make predictions related to traffic flow and/or to make selections of traffic routes. Such data sources include, but are not limited to, sources of current and past weather conditions, short and long term weather forecasts, school schedules and/or calendars, event schedules and/or calendars, traffic incident reports provided by human operators (e.g., first responders, law enforcement personnel, highway crews, news media, travelers, etc.), road work information, holiday schedules, etc.

The third-party computing systems 390 include one or more optional computing systems that are operated by parties other than the operator(s) of the predictive traffic information systems, such as parties who receive traffic-related data from one or more of the predictive traffic information systems and who make use of the data in some manner. For example, the third-party computing systems 390 may be systems that receive predicted traffic information from one or more of the predictive traffic information systems, and that provide related information (whether the received information or other information based on the received information) to users or others (e.g., via Web portals or subscription services). Alternatively, the third-party computing systems 390 may be operated by other types of parties, such as media organizations that gather and report predicted traffic condition and route information to their consumers, or online map companies that provide predicted traffic-related information to their users as part of travel-planning services.

In this illustrated embodiment, the Predictive Traffic Information Provider system 350 includes a Data Supplier component 352, a Traffic Prediction Model Generator component 354, and a Dynamic Traffic Predictor component 356. The Data Supplier component obtains current condition data that may be used by one or more of the other components or other predictive traffic information systems, such as from the data sources previously discussed, and makes the information available to the other components and predictive traffic information systems. In some embodiments, the Data Supplier component may optionally aggregate obtained data from a variety of data sources, and may further perform one or more of a variety of activities to prepare data for use, such as to place the data in a uniform format; to detect and possibly correct errors or missing data (e.g., due to sensor outages and/or malfunctions, network outages, data provider outages, etc.); to filter out extraneous data, such as outliers; to discretize continuous data, such as to map real-valued numbers to enumerated possible values; to sub-sample discrete data (e.g., by mapping data in a given range of values to a smaller range of values); to group related data (e.g., a sequence of multiple traffic sensors located along a single segment of road that are aggregated in an indicated manner); etc. Information obtained by the Data Supplier component may be provided to other predictive traffic information systems and components in various ways, such as to notify others when new data is available, to provide the data upon request, and/or to store the data in a manner that is accessible to others (e.g., in one or more databases on storage 340 or elsewhere, not shown).

In the illustrated embodiment, the Traffic Prediction Model Generator component uses obtained observation case data to generate predictive models used to make predictions about traffic conditions, as previously discussed. In some embodiments, the Traffic Prediction Model Generator component utilizes historical observation case data to automatically learn the structure of a Bayesian network for a given group of one or more roads, and further automatically learns multiple decision tree models that each may be used to make predictions of traffic flow on a particular road segment for a particular indicated time. The created predictive models may then be provided to other predictive traffic information systems and components in various ways, such as to notify others when the new models are available, to provide the models upon request, and/or to store the models in a manner that is accessible to others (e.g., in one or more databases on storage 340 or elsewhere, not shown).

The Dynamic Traffic Predictor component utilizes the predictive models generated by the Traffic Prediction Model Generator component to generate predictions of traffic conditions for one or more indicated times, such as based on real-time and/or other current condition information. Such predictions may be made at various times, such as periodically (e.g., every five or ten minutes), when new and/or anomalous data (e.g., a traffic accident incident report) has been received, upon request, etc. The generated predicted traffic condition information may then be provided to other predictive traffic information systems and components and/or to others in various ways, such as to notify others when new information is available, to provide the information upon request, and/or to store the information in a manner that is accessible to others (e.g., in one or more databases on storage 340 or elsewhere, not shown).

If present, the optional Route Selector system 360 selects travel route information based on predicted traffic condition information, and provides such route information to others in various ways. In some embodiments, the Route Selector system receives a request from a client to provide information related to one or more travel routes between a starting and ending location in a given geographic area at a given date and/or time. In response, the Route Selector system obtains predictions of road conditions for the specified area during the specified time period from, for example, the Predictive Traffic Information Provider system, and then utilizes the predicted road condition information to analyze various route options and to select one or more routes based on indicated criteria (e.g., shortest time). The selected route information may then be provided to other predictive traffic information systems and components and/or to others in various ways, such as to notify others when information is available, to provide the information upon request, and/or to store the information in a manner that is accessible to others (e.g., in one or more databases on storage 340 or elsewhere, not shown).

It will be appreciated that the illustrated computing systems are merely illustrative and are not intended to limit the scope of the present invention. Computing system 300 may be connected to other devices that are not illustrated, including through one or more networks such as the Internet or via the Web. More generally, a "client" or "server" computing system or device, or predictive traffic information system and/or component, may comprise any combination of hardware that can interact and perform the described types of functionality, optionally when programmed or otherwise configured with appropriate software instructions, including without limitation desktop or other computers, database servers, network storage devices and other network devices, PDAs, smart phones and other cell phones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated system components may in some embodiments be combined in fewer components or distributed in additional components. Similarly, in some embodiments the functionality of some of the illustrated components may not be provided and/or other additional functionality may be available. Note also that while various items are illustrated as being stored in memory or on storage while being used, these items or portions of them can be transferred between memory and other storage devices for purposes of memory management and/or data integrity. Alternatively, in other embodiments some or all of the software components may execute in memory on another device and communicate with the illustrated computing system/device via inter-computer communication. Some or all of the system components or data structures may also be stored (e.g., as software instruction contents or structured data contents) on a non-transitory computer-readable storage medium, such as a hard disk or flash drive or other non-volatile storage device, volatile or non-volatile memory (e.g., RAM or ROM), a network storage device, or a portable media article (e.g., a DVD disk, a CD disk, an optical disk, a flash memory device, etc.) to be read by an appropriate drive or via an appropriate connection. The system components and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
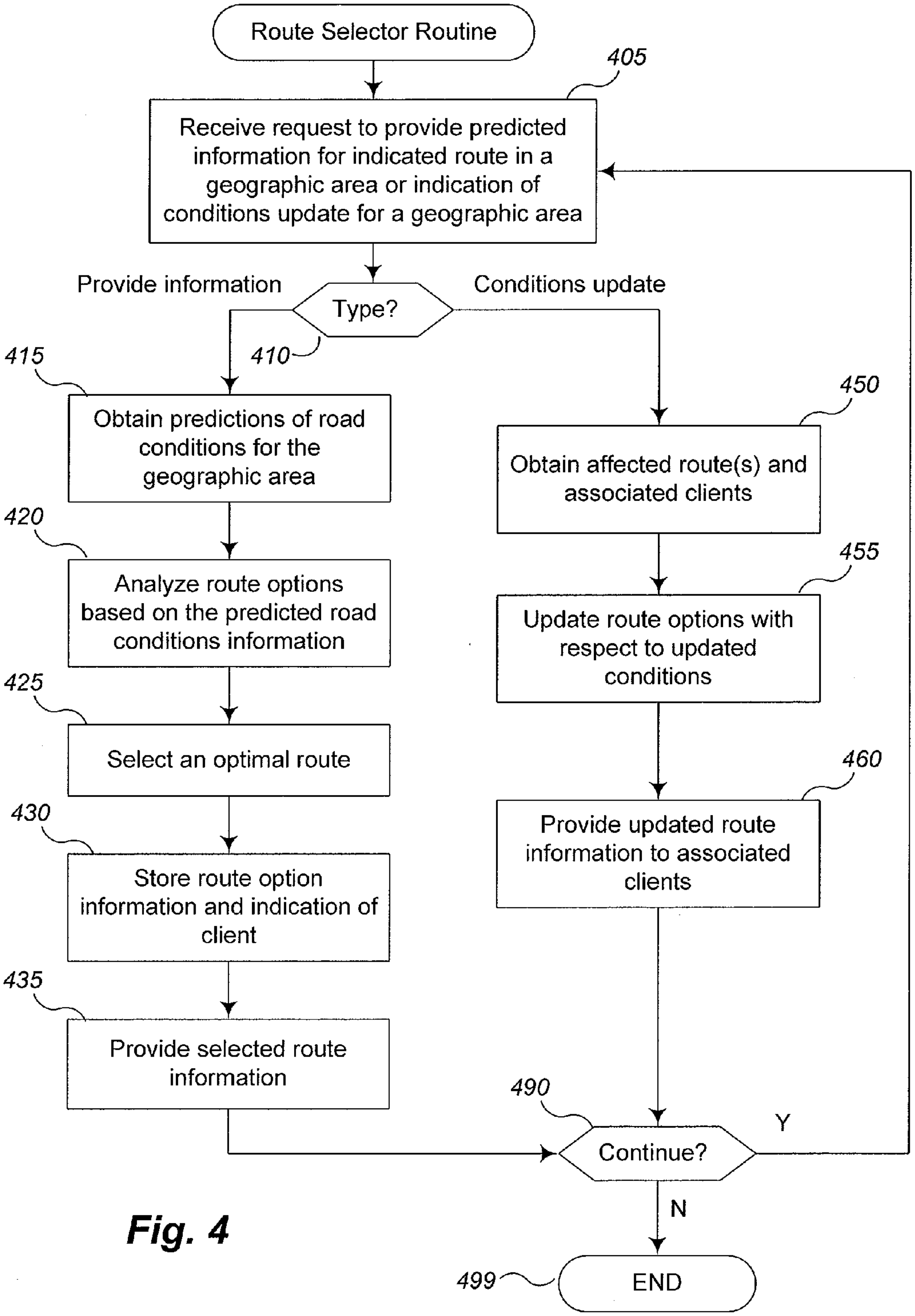
FIG. 4 is a flow diagram of an embodiment of a Route Selector routine.

FIG. 4 is a flow diagram of an embodiment of a Route Selector routine. This routine may be provided, for example, by execution of the Route Selector system 360 of FIG. 3. The routine uses predicted traffic conditions for one or more indicated times to plan routes through a network of roads, such as to determine one or more routes that are predicted to be optimal, near-optimal, or otherwise preferred.

The routine begins in step 405 and receives a request to provide predicted information for an indicated route in a geographic area (e.g., a route indicated with a starting location, an ending location, a preferred arrival time, a preferred departure time and/or other indicated criteria for use in identifying or evaluating route options) or receives an indication of an update in relevant conditions for a geographic area. In step 410, the route determines the type of input received, and if a request to provide route information has been received, the routine proceeds to step 415 and obtains predictions of road conditions at one or more indicated times for the geographic area, such as for a current time and/or for one or more future times that correspond to the preferred travel time (if any). The routine may obtain this information from, for example, the Predictive Traffic Information Provider system 350 described with reference to FIG. 3, such as in an interactive manner or instead by retrieving previously generated prediction information. In step 420, the routine then analyzes route options based on the obtained predicted road conditions information, such as to determine predicted travel times for each of the route options. The route options may include a number of alternative routes to travel from the indicated starting location (if any) to the indicated ending location (if any), such as a set of pre-determined route options or instead all route options that satisfy indicated criteria (e.g., using roads of a certain size or class, using any roads for which predicted information is available, using all possible route options, using domain-specific heuristics to constrain the number of possible routes in order to reduce the search space, etc.). In step 425, the routine then optionally selects a predicted optimal route from the set of route options, or in some embodiments more generally ranks the route options (e.g., in a relative or absolute manner) using one or more criteria (e.g., the minimum travel time, minimum travel distance, minimum travel speed, minimum travel speed variability, maximum confidence in a route that otherwise satisfies such criteria, etc. or combinations thereof) and selects some or all of those route options. In step 430, the routine stores the route option information, optionally with an indication of the client that requested the route information (e.g., to enable later provision of updated information to the client should conditions change), and in step 435 provides at least some of the selected route information to the client (e.g., only information for the predicted optimal or top-ranked route, information for a specified number of routes and/or all route options, etc.).

If it is instead decided in step 410 that an indication of a conditions update for a geographic area has been received (e.g., an indication of a traffic incident along a particular roadway), the routine proceeds to step 450 and identifies any affected route(s) whose associated clients are known. In step 455, the routine updates route options with respect to the updated conditions for the identified routes, with the updated conditions possibly including real-time traffic data and/or updated predictions information from the Predictive Traffic Information Provider system, and with the updated route options possibly resulting in a different predicted optimal or top-ranked route option. In step 460, the routine then optionally provides updated route information to the associated clients, such as if the updated route options information would result in different client behavior. For example, the updated route information may be provided to vehicle-based clients that may be traveling on or near the affected routes, or more generally to client devices 382 that had previously been used to obtain information regarding one or more of the affected routes.

After steps 435 or 460, the routine continues to step 490 to determine whether to continue, such as until an explicit indication to terminate the routine. If it is determined to continue, the routine returns to step 405, and if not continues to step 499 and ends.

Figure 5A:
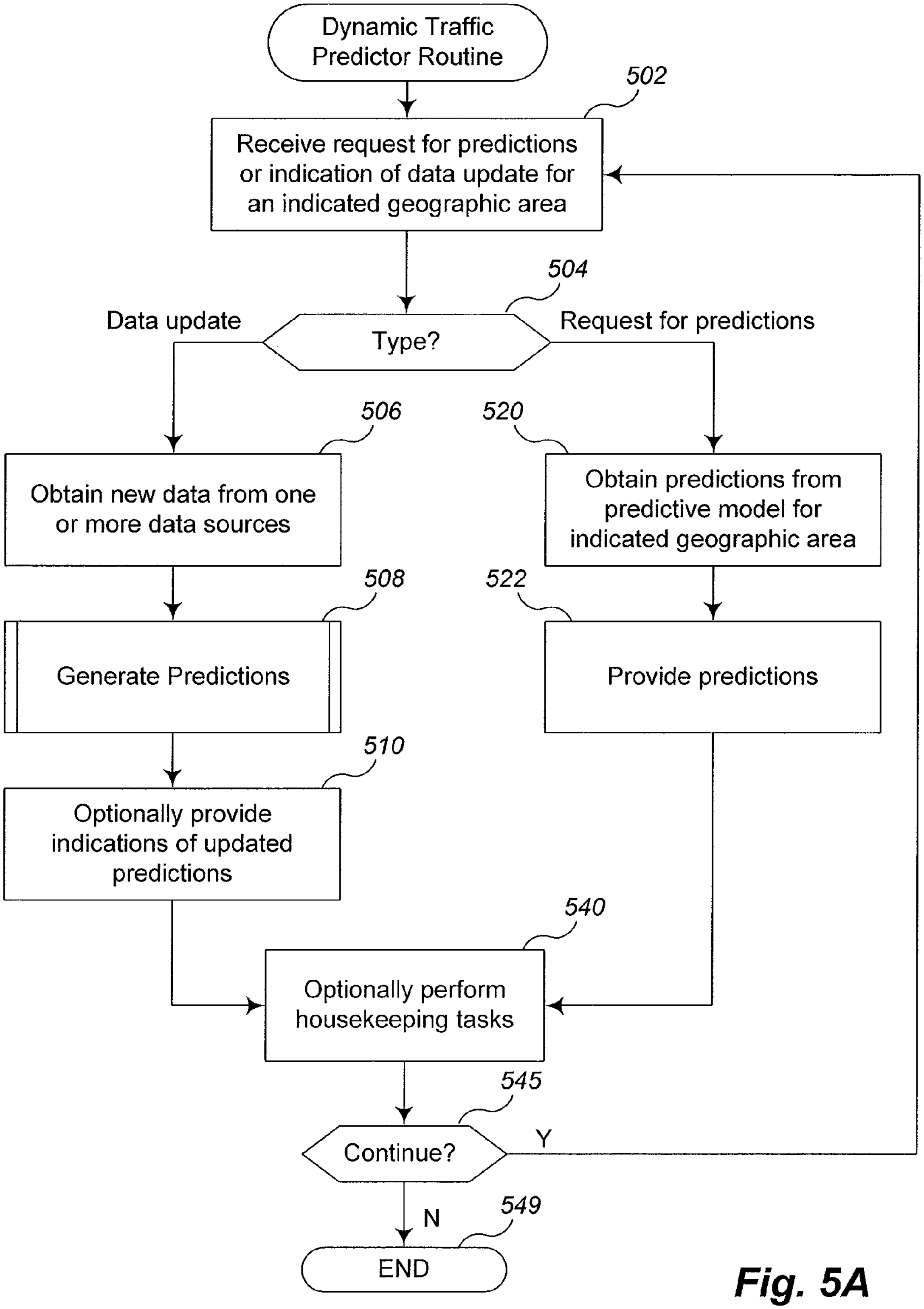
FIGS. 5A-5B are flow diagrams of embodiments of a Dynamic Traffic Predictor routine and an associated Generate Predictions subroutine.
Figure 5B:
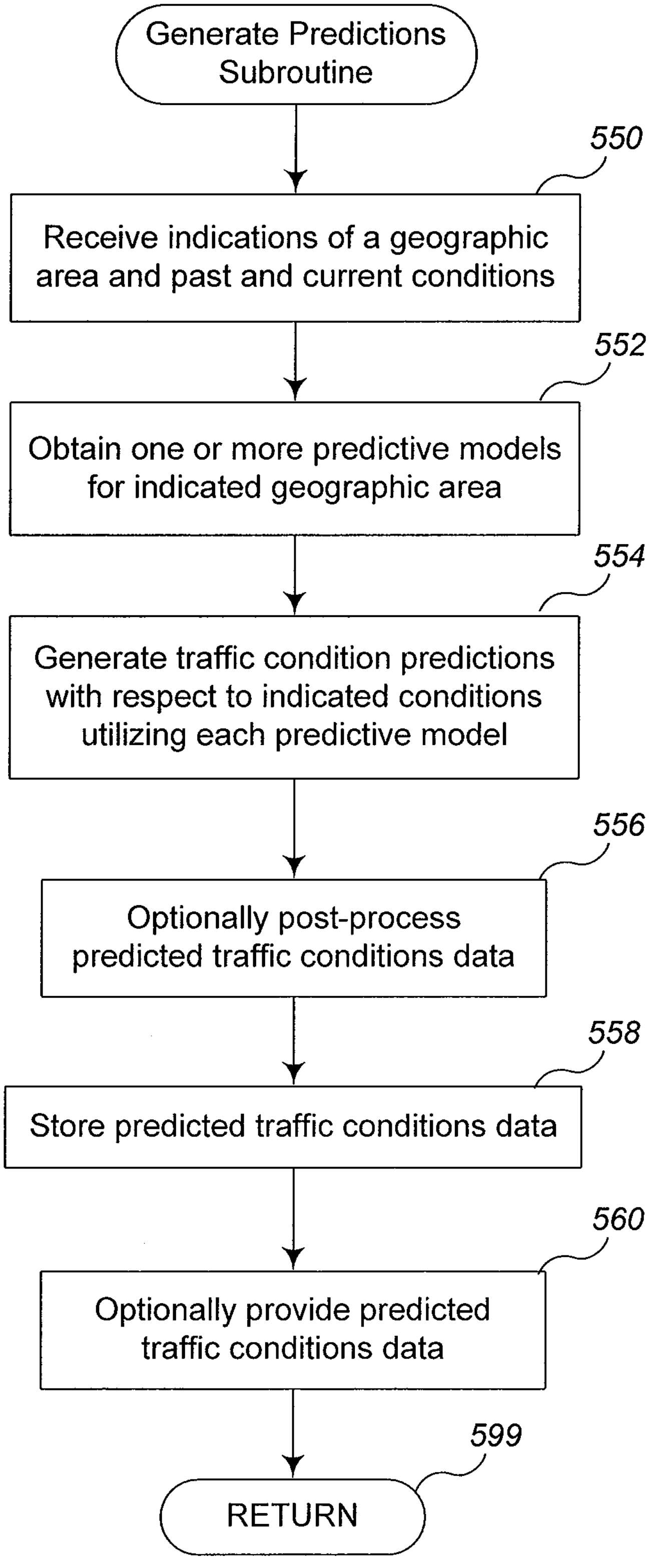

FIGS. 5A-5B are flow diagrams of embodiments of a Dynamic Traffic Predictor routine and an associated Generate Predictions subroutine. The routine of FIG. 5A and/or subroutine of FIG. 5B may be provided, for example, by execution of the Dynamic Traffic Predictor component 356 in FIG. 3, such as to generate predictions of traffic conditions for one or more indicated times for each of one or more roads or road segments in one or more geographic areas. In this illustrated embodiment, the routine generates predictions when new current condition input information is received or upon request (e.g., based on periodic requests to generate new predictions, such as every five minutes), but in other embodiments could generate such predictions at other times (e.g., periodically, such as by retrieving any available current condition input information at that time).

The routine in FIG. 5A begins in step 502 and receives a request for prediction information (e.g., for an indicated road or road segment at an indicated time, or for all roads and road segments in a geographic area based on current conditions) or an indication of a data update for an indicated geographic area. In step 504, the routine determines whether a data update or a predictions request was received, and if it is determined that a data update was received, the routine proceeds to step 506 and obtains new current conditions data from one or more data sources for use as input in the prediction generations (e.g., from the Data Supplier component 352 in FIG. 3, from appropriate stored information, from other sources, etc.). In step 508, the routine executes a Generate Predictions subroutine that generates an updated set of predictions with respect to the newly obtained data, as discussed in greater detail with respect to FIG. 5B, with the generated prediction information stored for later use. In step 510, the routine optionally provides indications of the updated prediction information obtained in step 508 to one or more clients, such as to users who have previously expressed an interest in such information, to third-party entities who may use such prediction information, etc.

If it was instead determined in step 504 that a request for predictions was received, the routine proceeds to step 520 and obtains previously generated predictions from one or more predictive models for the indicated geographic area, such as predictions generated in step 508, although in other embodiments the routine may instead dynamically generate predictions in response to some or all requests, such as by instead proceeding to block 508. In step 522, the routine provides the obtained predictions to the client. After steps 510 and 522, the routine proceeds to step 540 and optionally performs any housekeeping tasks. In step 545, the routine determines whether to continue, such as until an explicit indication to terminate is received. If it is determined to continue, the routine returns to step 502, and if not continues to step 549 and ends.

FIG. 5B is a flow diagram of an embodiment of a Generate Predictions subroutine that generates predictions of traffic conditions for one or more indicated times for each of one or more roads or road segments in one or more geographic areas, such as for use by the Dynamic Traffic Predictor routine illustrated in FIG. 5A. In this example embodiment, the subroutine generates the traffic conditions predictions for a geographic area using probabilistic techniques via generated predictive models that include a Bayesian network and multiple corresponding decision trees, such as is previously discussed, but in other embodiments this or a related subroutine could instead generate traffic conditions predictions in other manners.

The subroutine begins in step 550 and receives indications of a geographic area and of past and current conditions for use as input information. As described in greater detail elsewhere, such conditions may include information about current and past weather conditions, current weather forecasts, event schedules, school schedules, current and past traffic conditions for particular road segments or roads, etc. In step 552, the subroutine obtains one or more generated predictive models for the indicated geographic area that include a Bayesian network and one or more decision trees, such as by retrieving previously generated models or by requesting the models from a Traffic Prediction Model Generator component. In step 554, the subroutine generates traffic condition predictions for the indicated time(s) based on the current conditions input information by using the predictive models, such as to generate predictions for an indicated current time and/or for each of multiple future times for each road or road segment in the indicated geographic area. In step 556, the subroutine then optionally performs post-processing of the predicted traffic conditions information, such as to include merging, averaging, aggregating, selecting, comparing, or otherwise processing one or more sets of output data from the one or more predictive models. In step 558, the subroutine stores the predicted traffic conditions information, and in step 560 optionally provides the predicted traffic conditions information to one or more clients. In step 599 the subroutine returns.

Figure 6:
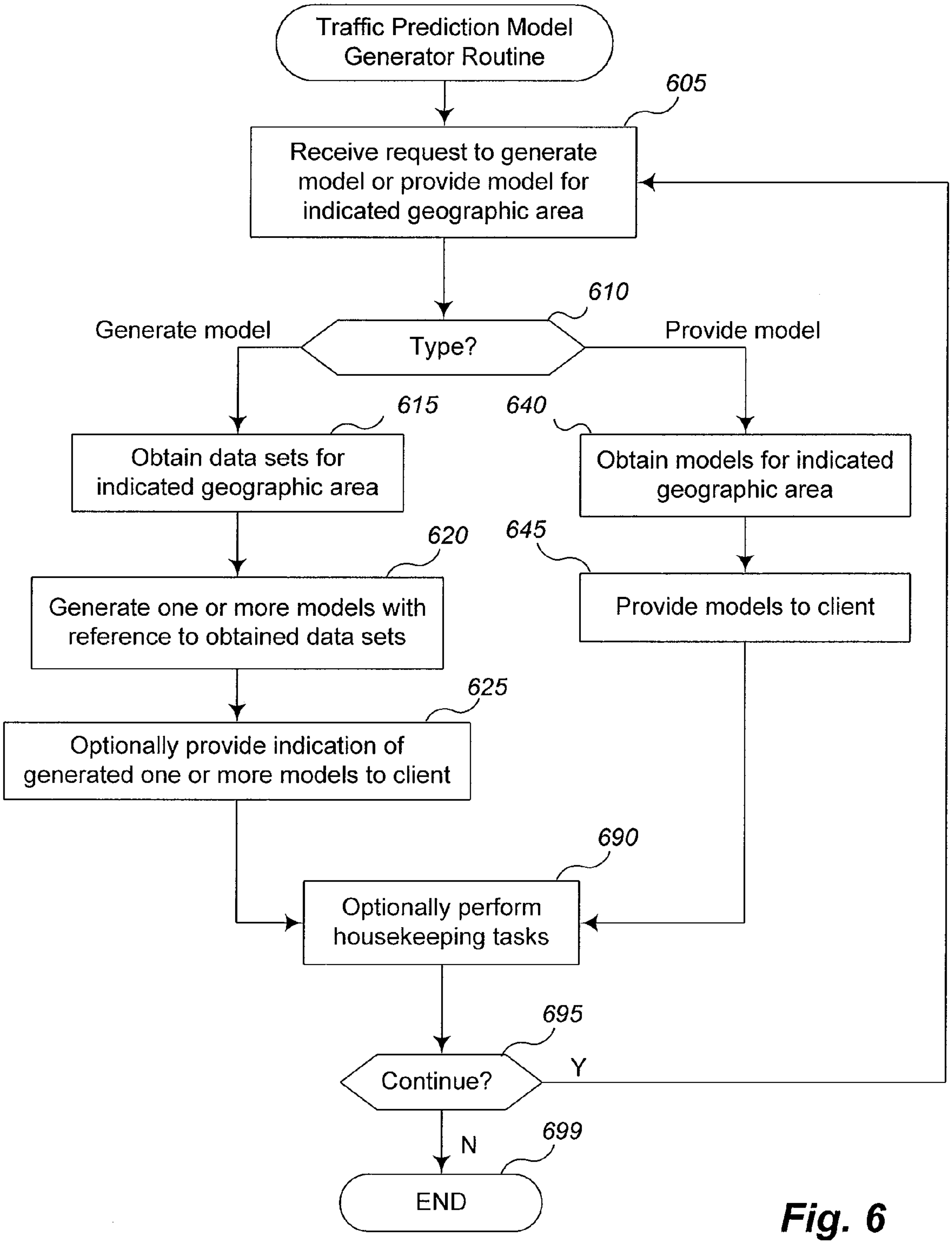
FIG. 6 is a flow diagram of an embodiment of a Traffic Prediction Model Generator routine.

FIG. 6 is a flow diagram of an embodiment of a Traffic Prediction Model Generator routine. The routine may be provided, for example, by execution of the Traffic Prediction Model Generator component 354 of FIG. 3, such as to generate predictive models based on observed case information for later use in generating traffic conditions predictions.

The routine begins in step 605 and receives a request to generate predictive models for an indicated geographic area or to provide previously generated predictive models for an indicated geographic area. In step 610, the routine determines the type of received request, and if a request to generate a model is received, the routine proceeds to step 615 to obtain observed data for the indicated geographic area, such as from the Data Supplier component 352 or from stored data. In step 620, the routine then generates one or more predictive models with reference to the obtained observed data, as discussed in greater detail elsewhere. In step 625, the routine then optionally provides an indication of the generated one or more models to a client from whom the request was received and/or to others (e.g., the Dynamic Traffic Predictor component 356 of FIG. 3), or otherwise stores the generated models for later use.

If it was instead determined in step 610 that a request to provide a model is received, the routine continues to step 640 where one or more previously generated predictive models for the indicated geographic area are retrieved. In step 645, the routine then provides those models to the client who requested the models or to another indicated recipient, such as the Dynamic Traffic Predictor component 356 and/or a third-party computing system that utilizes the models to perform its own predictions.

After steps 625 and 645, the routine proceeds to step 690 and optionally performs any housekeeping tasks. In step 695, the routine then determines whether to continue, such as until an explicit indication to terminate is received. If it is determined to continue, the routine returns to step 605, and if not continues to step 699 and ends.

In some embodiments, the selection of routes may be based on a variety of types of indicated information, such as when information is requested for fully or partially specified travel routes (with a partially specified route not specifying every road segment between a given starting and ending location), when a starting and ending location are specified (optionally with one or more intermediate locations), when one or more desired times for travel are indicated (e.g., on a particular day; between a first and second time; with an indicated arrival time; etc.); when one or more criteria for assessing route options are specified (e.g., travel time, travel distance, stopping time, speed, etc.), etc. If a starting location is not specified, in some embodiments, a current location of the requester may be determined and used as the starting location. In addition, varying amounts of information related to travel routes may be provided in various embodiments, such as to provide clients with only a predicted optimal selected route or to provide clients with a variety of details about multiple route options analyzed (e.g., in a ranked or otherwise ordered manner, such as by increasing travel time). In addition, some embodiments may represent travel routes in various manners, including human-readable, textual representations using common street and road names and/or machine-readable representations such as series of GPS waypoints.

Various embodiments may also employ various conventions for representing and providing actual traffic condition information and predicted traffic condition information. For example, in some embodiments, a data feed may be provided for each geographic area of interest to indicate predicted traffic condition information for each of one or more indicated times. The data feed format may, for example, be defined by an XML schema that defines an element type with one or more attributes that each contain information related to a predicted traffic congestion level condition for a single road segment for each of one or more indicated times, with a fragment of an example such XML stream or file as follows:

<Segment id="423" speed="55" abnormality="0" color="3"
next3hours="3,3,3,3,2,1,1,0,0,0,1,1"
confidence="2,2,2,1,1,0,0,1,1,1,0,0"/>

The above XML fragment represents the current actual and predicted future traffic conditions for an example road segment 423 (which may represent a single physical sensor, a group of physical sensors that correspond to a logical road segment, one or more data sources other than traffic sensors, etc.). In this example, the current actual average speed is indicated to be 55 MPH, no abnormalities exist with respect to the current actual average speed (in this example, abnormalities indicate a difference in the actual current average speed with respect to what would be expected for the current average speed, such as by using a baseline average speed for that time of day, day of week, week of month, and/or month of year); and the current actual traffic congestion level is indicated to be 3 (in this example, congestion levels are expressed as integers between 0 and 3, with 3 corresponding to the lowest level of traffic congestion and thus being equivalent to a value of green, and with 0 being equivalent to a value of black). In addition, in this example the comma-delimited list labeled "next3hours" indicates predicted future traffic congestion levels for the next twelve future times at 15 minute intervals, although in other embodiments could indicate a predicted current traffic congestion level value, whether instead of or in addition to the predicted future traffic congestion levels. In this example, confidence level information is also provided for each of the twelve predicted traffic congestion levels, with the comma-delimited list labeled "confidence" indicating such confidence levels, although in other embodiments such confidence levels may not be generated and/or provided. In this example, confidence levels are expressed as integers between 0 and 2, with 2 corresponding to the highest level of confidence and 0 being the lowest level of confidence, although other means of representing predicted traffic congestion levels and associated confidence levels may be used in other embodiments.

In addition, various embodiments provide various means for users and other clients to interact with one or more of the predictive traffic information systems. For example, some embodiments may provide an interactive console (e.g. a client program providing an interactive user interface, a Web browser-based interface, etc.) from which clients can make requests and receive corresponding responses, such as requests for information related to current actual and/or predicted traffic conditions, and/or requests to analyze, select, and/or provide information related to travel routes. In addition, some embodiments provide an API ("Application Programming Interface") that allows client computing systems to programmatically make some or all such requests, such as via network message protocols (e.g., Web services) and/or other communication mechanisms.

Various embodiments may further utilize various input information and provide various output information for the predictive models used to make traffic conditions predictions. In some embodiments, inputs to the predictive models related to date and time information include the following variables: MarketId (an identifier for a geographic region); DateTimeUtc (the time of day in Universal Time); DateTimeLocal (the time of day in local time); DateTimeKey, DateDayOfWeekLocal (the day of the week); DateMonthLocal (the month of the year); DateDayLocal; DateHourLocal (the hour of the day); DatePeriod15MinutesLocal (the 15 minute interval of the day); and HolidayLocal (whether the day is a holiday). In some embodiments, inputs to the predictive models related to current and past traffic conditions information include the following variables: RoadSegmentId (an identifier for a particular road segment); SpeedX (the current reported speed of traffic on road segment X); BlackStartLocalX (the length of time that black traffic congestion level conditions have been reported for road segment X); PercentBlackX (the percentage of sensors or other data sources associated with road segment X that are reporting black traffic congestion level conditions); PercentBlackX–N, where X is a particular road segment and N is a member of {15, 30, 45, 60} and where the value corresponds to the percentage of a road segment X (e.g., percent of sensors associated with the road segment) for which black traffic conditions were reported N minutes ago; RawColorX (the current color corresponding to a level of traffic congestion on road segment X); RawColorX–N, where X is a particular road segment and N is a member of {15, 30, 45, 60}, and where the value is a color corresponding to a level of traffic congestion on road segment X N minutes ago; SinceBlackX (the length of time since black traffic congestion levels have been reported for road segment X); HealthX; and AbnormalityX. In some embodiments, inputs to the predictive models related to weather conditions information include the following variables: Temperature (current temperature); WindDirection (current wind direction); WindSpeed (current wind speed); SkyCover (current level of cloud or haze); PresentWeather (current weather state); and RainNHour, where N is a member of {1, 3, 6, 24} and represents precipitation accumulation in the previous N hour(s); and MetarId. In some embodiments, inputs to the predictive models related to event and school schedules information include the following variables: EventVenueId (a venue identifier); EventScheduleId (a schedule identifier); DateDayLocal (the day of a given event); StartHourLocal (the start hour of a given event); EventTypeId (an event type identifier); EventVenueId (a venue identifier); SchoolLocationId (a school location identifier); and IsSchoolDay (whether or not the current day is a school day).

In some embodiments, outputs to the predictive models related to traffic conditions include the following variables: RawColorXN, where X is a particular road segment and N is 0 or a member of {15, 30, 45, 60, 75, 90, 105, 120, 135, 150, 165, 180}, and where the value is a color corresponding to an expected level of traffic congestion on road segment X in N minutes time; and PredRawColorXNProb to indicate confidence in given predictions, where X and N are defined as above with reference to the RawColorXN variables and the value is the confidence level in prediction for road segment X in N minutes time (e.g., based on the level of historical support from observed data for the decision tree path taken to make the prediction).

The following illustrates one example of possible values or ranges of values that may be taken by various of the variables described above, with the indicator " . . . " between two numbers indicating that any integer between and including those two numbers are possible values (e.g., "1 . . . 4" represents {1, 2, 3, 4}), and with possible values of 0 and 1 indicating true and false for appropriate variables (e.g., casedata.HolidayLocal). In other embodiments, other input and/or output variables may be used, and their values may be represented in other manners.

| Variable Name | Example Possible Values |
|---|---|
| eventschedule.EventScheduleId | Integer |
| eventschedule.EventVenueId | Integer |
| eventschedule.Name | "Seattle Mariners Game" |
| eventschedule.DateDayLocal | 1 . . . 31 |
| eventschedule.StartHourLocal | 0 . . . 23 |
| eventschedule.EventTypeId | Integer |
| eventvenue.EventVenueId | Integer |
| eventvenue.Name | "Safeco Field" |
| eventvenue.MarketId | Integer |
| casedata.DateTimeUtc | Feb. 13, 2006 12:15:00 |
| casedata.DateTimeLocal | Feb. 13, 2006 04:15:00 |
| casedata.DateDayOfWeekLocal | 1 . . . 7 |
| casedata.DateMonthLocal | 1 . . . 12 |
| casedata.DateHourLocal | 0 . . . 23 |
| casedata.HolidayLocal | 0, 1 |
| roadsegmentdata.RoadSegmentId | Integer |
| roadsegmentdata.SpeedX | 0..100 (mph) |
| roadsegmentdata.BlackStartLocalX | Before 0745, 0745-0759, 0800-0814, 0815-0829, 0830-0844, 0845-0859, . . . , 1915-1929, After 1930 |
| roadsegmentdata.SinceBlackX | Integer (minutes) |
| roadsegmentdata.PercentBlackX | none, 0-15, 15-30, 30-50, 50-75, 75-100 |
| roadsegmentdata.PercentBlackX-N | none, 0-15, 15-30, 30-50, 50-75, 75-100 |
| roadsegmentdata.RawColorX | 0, 1, 2, 3 |
| roadsegmentdata.RawColorXN | 0, 1, 2, 3 |
| roadsegmentdata.RawColorX-N | 0, 1, 2, 3 |
| roadsegmentdata.ColorX | 0, 1, 2, 3 |
| roadsegmentdata.HealthX | 0, 1 |
| roadsegmentdata.AbnormalityX | 0, 1 |
| roadsegmentdata.PredRawColorXN | 0, 1, 2, 3 |
| roadsegmentdata.PredRawColorXNProb | Real [0, 1] |
| weather.MetarId | Integer |
| weather.MarketId | Integer |
| weather.Temperature | 32-40 F, 40-80 F, Extreme Heat, Freezing, Hot, Unknown |
| weather.WindDirection | N, NE, E, SE, S, SW, W, NW |
| weather.WindSpeed | Breezy, Calm, Windy, Heavy, Unknown |
| weather.SkyCover | Broken Clouds, Clear Skies, Few Clouds, Obscured Cover, Overcast, Scattered Clouds, Unknown |
| weather.PresentWeather | Blowing Snow, Clear or Fair, Cloudy, Fog, Haze, Mist, Rain, Snow, Thunderstorms, Unknown, Windy |
| weather.RainNHour | Extreme Rain, Hard Rain, No Rain, Soft Rain, Trace Rain, Unknown |
| schoollocation.SchoolLocationId | Integer |
| schoollocation.Name | "Lake Washington" |
| schoollocation.MarketId | Integer |
| schoolschedule.IsSchoolDay | 0, 1 |

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:

receiving information describing a network of multiple roads in a geographic area, each of the roads having multiple road segments for which traffic congestion is distinctly tracked; and automatically facilitating navigation of vehicles over the network of roads based on predicted traffic congestion of the roads by, for each of multiple users:

receiving, by one or more configured computing systems of a predictive traffic information provider system, a request from the user for information indicating predicted traffic conditions of roads of the network for travel to an indicated destination;

identifying, by the one or more configured computing systems, a plurality of road segments along one or more routes over the roads of the network to the indicated destination from at least one possible starting position, each of the one or more routes including multiple of the identified road segments;

retrieving, by the one or more configured computing systems, information indicating current conditions that affect traffic on the identified road segments, the indicated current conditions including current weather for the geographic area, current events that are scheduled to occur in the geographic area, current school sessions that are scheduled to occur in the geographic area, and current levels of traffic on other road segments of the roads that are distinct from the identified road segments;

predicting, by the one or more configured computing systems, an expected level of traffic congestion at an indicated time for each of the identified road segments based at least in part on the indicated current conditions;

for each of the one or more routes, determining, by the one or more configured computing systems, a predicted travel time for the route based on the predicted expected traffic congestion levels for the multiple road segments of the route; and providing, by the one or more configured computing systems, information to the user that indicates the determined predicted travel time for at least one of the routes to the indicated destination, to enable the user to navigate a vehicle over the network of roads based on predicted traffic congestion levels.

2. The method of claim 1 wherein, for each of at least some of the multiple users, the providing of the information to the user includes displaying to the user a map on which multiple route options are indicated and on which an optimal one of the route options is identified.

3. The method of claim 1 further comprising, for each of at least some of the multiple users, after the providing of the information to the user, receiving information indicating updated current conditions, predicting an updated expected level of traffic congestion at the indicated time for each of at least one of the identified road segments at based at least in part on the updated current conditions, and providing updated information to the user that indicates an updated predicted travel time for at least one route to the indicated destination based at least in part on the predicted updated expected levels of traffic congestion.

4. The method of claim 1 wherein the predicting of the expected levels of traffic congestion is based on at least one predictive model for the network of roads in the geographic area, and wherein the method further comprises automatically generating the at least one predictive models based at least in part on prior observed levels of traffic congestions for the identified road segments and on prior conditions that affected the prior observed traffic congestion levels.

5. The method of claim 1 wherein, for at least one of the multiple users, the indicated current conditions for use in predicting expected levels of traffic congestion further include current traffic accidents on the roads, current construction activities on the roads, a current time of day, and a current day of week, and the indicated time is a current time.

6. A computer-implemented method comprising:

receiving, by one or more configured computing systems, information indicating current traffic conditions at a first time for each of one or more of a plurality of road segments of multiple related roads, and information indicating other current conditions at the first time that affect traffic on the plurality of road segments, the other current conditions including multiple of current weather conditions, current events that are scheduled to occur, and current schedules for school sessions;

automatically predicting, by the one or more configured computing systems, multiple distinct levels of traffic congestion at an indicated time for multiple of the plurality of road segments, the automatic predicting being based on the indicated current traffic conditions for the first time and the indicated other current conditions for the first time, and one or more of the predicted traffic congestion levels being distinct from historical average traffic congestion levels corresponding to the indicated time; and using at least some of the predicted traffic congestion levels to facilitate travel on the roads.

7. The method of claim 6 wherein the automatic predicting of the multiple levels of traffic congestion is based on use of at least one predictive model that uses the indicated current traffic conditions and the indicated other current conditions as input, and includes predicting one of the multiple traffic congestion levels for each of the multiple road segments for the indicated time.

8. The method of claim 7 wherein the at least one predictive model includes a Bayesian network.

9. The method of claim 7 further comprising automatically generating the at least one predictive model based at least in part on observed past traffic congestion levels on the road segments and on past traffic conditions and past other conditions that affected the past traffic congestion levels on the road segments.

10. The method of claim 6 further comprising, after the automatic predicting of the multiple levels of traffic congestion, receiving updated current conditions information that is distinct from the indicated current traffic conditions and the indicated other current conditions, automatically predicting a new level of traffic congestion for the indicated time for each of at least one of the plurality of road segments, and using one or more of the predicted new traffic congestion levels to facilitate travel on the roads.

11. The method of claim 10 wherein the using of the at least some predicted traffic congestion levels to facilitate travel on the roads is performed by the one or more configured computing systems and includes providing information about the at least some predicted traffic congestion levels to one or more recipients for use, and wherein the using of the predicted new traffic congestion levels to facilitate travel on the roads includes providing updated information about the predicted new traffic congestion levels to at least one of the recipients.

12. The method of claim 6 wherein the indicated current traffic conditions for each of the one or more road segments include at least one of an average speed on the road segment and a traffic volume on the road segment.

13. The method of claim 12 wherein the indicated other current conditions include the current weather conditions, the current events that are scheduled to occur, the current schedules for school sessions, current traffic accidents on the plurality of road segments, current construction activities on the plurality of road segments, a current time of day, and a current day of week.

14. The method of claim 13 wherein the automatic predicting of the multiple distinct levels of traffic congestion is further based on information about prior traffic conditions before the first time for one or more of the multiple road segments.

15. The method of claim 6 wherein the received information indicating the current traffic conditions for the one or more road segments is obtained at least in part from a network of multiple traffic sensors such that one or more of the multiple traffic sensors corresponds to each of the one or more road segments.

16. The method of claim 6 wherein the received information indicating the current traffic conditions is obtained at least in part from multiple vehicles traveling the multiple related roads, each vehicle able to determine vehicle travel data that includes at least one of location of the vehicle, speed of the vehicle, and travel direction of the vehicle, and to provide the determined vehicle travel data.

17. The method of claim 6 wherein the received information indicating the current traffic conditions is obtained at least in part from multiple users traveling the multiple related roads, each user having a mobile device operative to provide geo-location data including location of the device.

18. The method of claim 6 wherein the indicated time is a current time, wherein the first time is a prior time within a determined length of time of the current time, and wherein the multiple road segments include the one or more road segments.

19. The method of claim 6 wherein the indicated time is a current time, wherein the first time is the current time, and wherein the multiple road segments are distinct from the one or more road segments.

20. The method of claim 6 wherein the using of the at least some predicted traffic congestion levels to facilitate travel on the roads includes at least one of initiating presentation of the at least some predicted traffic congestion levels to a user and of providing indications of the at least some predicted traffic congestion levels to a third party that uses the provided indications to facilitate travel on the roads by others.

21. The method of claim 6 wherein the using of the at least some predicted traffic congestion levels to facilitate travel on the roads includes generating comparative information regarding the at least some predicted traffic congestion levels and other traffic congestion levels for at least some of the multiple road segments, and providing one or more indications of the generated comparative information.

22. The method of claim 6 wherein the using of the at least some predicted traffic congestion levels to facilitate travel on the roads includes:

identifying multiple route options between a starting location and a destination location over the multiple roads, each of the route options including at least one of the multiple road segments;

selecting at least one of the multiple route options as being preferred based at least in part on the predicted traffic congestion levels; and providing one or more indications of the selected route options.

23. The method of claim 22 wherein the using of the at least some predicted traffic congestion levels to facilitate travel on the roads includes initiating display to a user of a map on which one or more of the multiple route options are indicated.

24. The method of claim 6 wherein the predicted levels of traffic congestion each have at least one associated vehicle speed, and wherein the multiple roads are part of an interconnected network of roads in a single geographic area.

25. A non-transitory computer-readable medium whose stored contents configure a computing system to perform a method, the method comprising:

receiving information indicating current traffic conditions at a first time for each of at least one of multiple road segments of one or more roads, and information indicating other current conditions at the first time that affect traffic on the multiple road segments, the other current conditions including at least one of current weather conditions, current events that are scheduled to occur, and current schedules for school sessions;

predicting, by the configured computing system, traffic conditions at an indicated time for each of one or more of the multiple road segments of the one or more roads based at least in part on the indicated current traffic conditions and on the indicated other current conditions; and providing one or more indications of the predicted traffic conditions for use in facilitating travel on the one or more roads.

26. The non-transitory computer-readable medium of claim 25 wherein the predicting of the traffic conditions includes use of a predictive Bayesian network model for the one or more roads in order to predict a traffic congestion level at the indicated time for each of the one or more road segments, and wherein the predicted traffic congestion levels are distinct from historical average traffic congestion levels corresponding to the indicated time.

27. The non-transitory computer-readable medium of claim 25 wherein the indicated time is a current time, and wherein the first time is a prior time.

28. The non-transitory computer-readable medium of claim 25 wherein the indicated time is a current time, wherein the first time is the current time, and wherein the one or more road segments are distinct from the at least one road segment.

29. The non-transitory computer-readable medium of claim 25 wherein the method further comprises identifying a route between a starting location and an ending location based at least in part on the predicted traffic conditions, and wherein the providing of the one or more indications of the predicted traffic conditions includes indicating the identified route to a user.

30. The non-transitory computer-readable medium of claim 25 wherein the computer-readable medium is a memory of the configured computing system, and wherein the contents are instructions that when executed program the configured computing system to perform the method.

31. A computing system, comprising:

one or more processors;

a first component configured to, when executed by at least one of the one or more processors, predict traffic conditions at an indicated time for each of one or more of multiple road segments of one or more roads based at least in part on obtained information indicating current conditions related to the multiple road segments, the indicated current conditions including multiple of current weather conditions, current scheduled events, current school schedules, and current traffic conditions for at least one of the multiple road segments; and a second component configured to, when executed by at least one of the one or more processors, provide one or more indications of at least one of the predicted traffic conditions for use in facilitating travel on the one or more roads.

32. The computing system of claim 31 further comprising a memory on which is stored a predictive probabilistic model for use in the predicting of the traffic conditions, the predicted traffic conditions including a predicted traffic congestion level for the indicated time for each of the one or more road segments, and wherein the predicted traffic congestion levels are distinct from historical average traffic congestion levels corresponding to the indicated time.

33. The computing system of claim 31 wherein the indicated time is a current time, wherein the indicated current conditions correspond to the current time and include the current traffic conditions for the at least one road segment, and wherein the one or more road segments are distinct from the at least one road segment.

34. The computing system of claim 31 further comprising a third component configured to identify a route between a starting location and an ending location based at least in part on the predicted traffic conditions, wherein the providing of the one or more indications of the at least one predicted traffic conditions includes indicating the identified route to a user, wherein the first component is a dynamic traffic predictor component, and wherein the first and second components each includes software instructions for execution by the one or more processors.

35. The computing system of claim 31 wherein the first component consists of a means for predicting the traffic conditions at the indicated time, and wherein the second component consists of a means for providing the one or more indications of at least one predicted traffic conditions.

* * * * *

UNITED STATES PATENT AND TRADEMARK OFFICE

CERTIFICATE OF CORRECTION

PATENT NO. : 8,700,296 B2
APPLICATION NO. : 13/211177
DATED : April 15, 2014
INVENTOR(S) : Craig H. Chapman et al.

It is certified that error appears in the above-identified patent and that said Letters Patent is hereby corrected as shown below:

Title Page

Item (56):
"“Global Positioning Systems > Tracking Systems in the Yahoo! Directory,” Yahoo!® Small Business Directory, retrieved February 8, 2006, from http://dir.yahoo.com/Business_and_Economy/Busi-ness_to_Business/Navigation/Global_Positioning_Systems/Tracking_Systems, 8 pages.” should read, --“Global Positioning Systems > Tracking Systems in the Yahoo! Directory,” Yahoo!® Small Business Directory, retrieved February 8, 2006, from http://dir.yahoo.com/Business_and_Economy/Business_to_Business/Navigation/Global_Positioning_Systems/Tracking_Systems, 8 pages.--.

Item (56):
"“Powerful Tool Crunches Commutes,” March 8, 2005, National Science Foundation, retrieved January 20, 2006, from http://www.beat-thetraffic.com/aboutus/nsf20050308.htm, 2 pages.” should read, --“Powerful Tool Crunches Commutes,” March 8, 2005, National Science Foundation, retrieved January 20, 2006, from http://www.beatthetraffic.com/aboutus/nsf20050308.htm, 2 pages.--.

In the Claims

Claim 3, Column 27, Line 9:
“least one of the identified road segments at based at least in” should read, --least one of the identified road segments based at least in--.

Signed and Sealed this
Fourth Day of November, 2014

Michelle K. Lee
*Deputy Director of the United States Patent and Trademark Office*